(12) United States Patent
Guffens et al.

(10) Patent No.: US 6,588,009 B1
(45) Date of Patent: Jul. 1, 2003

(54) METHOD AND APPARATUS FOR COMPILING SOURCE CODE USING SYMBOLIC EXECUTION

(75) Inventors: Jan Guffens, Linden-Lubbeek (BE); Kurt Du Pont, Heist-op-den-Berg (BE)

(73) Assignee: Adelante Technologies NV, Leuven (BE)

( * ) Notice: Subject to any disclaimer, the term of this patent is extended or adjusted under 35 U.S.C. 154(b) by 0 days.

(21) Appl. No.: 09/450,325

(22) Filed: Nov. 29, 1999

(51) Int. Cl.$^7$ .................................................. G06F 9/45

(52) U.S. Cl. ........................ 717/161; 717/149; 717/151

(58) Field of Search ................................ 717/140–144, 717/149, 150–159, 160–161; 712/241; 709/102–108; 707/1, 100, 101, 102, 104.1, 200, 204; 711/100, 167–169

(56) References Cited

U.S. PATENT DOCUMENTS

| 5,491,823 | A | * | 2/1996 | Ruttenberg | 717/161 |
|---|---|---|---|---|---|
| 5,537,620 | A | * | 7/1996 | Breternitz, Jr. | 717/160 |
| 5,842,022 | A | * | 11/1998 | Nakahira et al. | 717/154 |
| 6,101,488 | A | * | 8/2000 | Hayashi et al. | 706/45 |
| 6,351,845 | B1 | * | 2/2002 | Hinker et al. | 717/128 |
| 6,374,403 | B1 | * | 4/2002 | Darte et al. | 717/150 |
| 6,393,423 | B1 | * | 5/2002 | Goedken | 707/10 |

OTHER PUBLICATIONS

Gupta. Loop Displacement: An Approach for Transforming and Scheduling Loops for Parallel Execution. IEEE. 1990. pp. 388–397.*

Huang et al. Efficient Run–Time Scheduling for Parallelizing Partially Parallel Loop. IEEE. 1997. pp. 397–403.*

Manjikian et al. Fusion of Loops for Parallelism and Locality. IEEE. 1997. pp. 193–209.*

Wayne Kelly, et al. "Finding Legal Reordering Tranformations Using Mappings"; University of Maryland; Apr. 29, 1994.

Steven W.K. Tjiang, et al. "Sharlit –A tool for building optimizers"; Stanford University.

Wayne Kelly, et al. "A Framework for Unifying Reordering Transformations"; University of Maryland; Nov., 1992; Revised Apr. 1993 Bjarne Steensgard "Sparse Functional Stores for Imperative Programs (summary)"; Microsoft Research, Remond Wa.

Dror E. Maydan, et al. "Data Dependence and Data–Flow Analysis of Arrays"; Stanford University.

Vipin Kumar "Algorithms for Constraint Satisfaction Problems: A Survey"; University of Minnesota; Appeared in AI Magazine 13(1):32–44, 1992.

Wayne Kelly, et al. "Selecting Affine Mappings based on Performance Estimation"; University of Maryland; Dec. 9, 1993.

(List continued on next page.)

*Primary Examiner*—Gregory Morse
*Assistant Examiner*—Wei Zhen
(74) *Attorney, Agent, or Firm*—Michael Schwarz & Associates P.C.

(57) ABSTRACT

A method and apparatus for optimizing the compilation of a computer program by exposing parallelism are disclosed. Information describing the operations in the program and their sequence is extracted and stored in a data structure. The operations in the program which involve index expressions are identified and symbolically executed, producing information describing the memory accesses by the program. Operations which can be executed in parallel are identified based on the information describing memory accesses. The program is interrogated with questions in a question data structure relating to how the program accesses memory. The answers to the questions are accumulated in index sets and back annotated into the question data structure.

20 Claims, 16 Drawing Sheets

OTHER PUBLICATIONS

William Pugh, et al. "Experiences with Constraint–based Array Dependence Analysis"; University of Marland, Nov. 1994.

Jean–Francois Collard, et al. "Fuzzy Array Dataflow Analysis"; ENS Lyon; Jul. 1995.

Dror E. Maydan, et al. "Array Data–Flow Analysis and Its Use in Array Privatization"; Stanford University Jan. 10–13, 1993.

Paul Feautrier "Data Analysis of Array and Scalar Refences"; Sep. 1991.

Michael Van Swaaij, Analytic Evaluation of Signal Life Characteristics Using Polyhedral Signal Analysis Techniques, Apr. 25, 1991.

Michael F.X.B. Van Swaaij, et al. "Modeling Data Flow and Control Flow for High Level Memory Management"; Aug. 1991.

Dror E. Maydan, et al. Data Dependence and Data–Flow Analysis of Arrays; Standford University.

Michael E. Wolf, et al. "A Loop Transformation Theory and an Algorithm to Maximize Parallelism"; Stanford University.

Yi–Qing Yang, et al. "Minimal Data Dependence Abstractions for Loop Transformations"; Ecole des Mines de Paris/ CRI.

Michael Wolfe "Beyond Induction Variables", Oregon Graduate Institute of Science and Technology.

Denis Barthou, et al. "Fuzzy Array Data flow Analysis" PRISM Laboratory Université de Veisailles.

* cited by examiner

DFA PROBLEM GRAPH

METHOD AND APPARATUS FOR COMPILING SOURCE CODE USING SYMBOLIC EXECUTION

BACKGROUND

The present invention relates to the field of computer software engineering. More specifically, it relates to a method and apparatus for compiling source code by exposing parallelism, thereby enabling the generation of more efficient compiled code, allowing more parallel instructions to be created and leading to better utilization of processor resources.

Compiling a computer program involves converting a high level language code (source code) into instructions which are intelligible to the processor of a computer (object code). One of the goals of a compiler is to generate an efficient implementation of the source code. In the case of processors which can execute more than one instruction in parallel, it is an objective of the compiler to compile the code such that as many instructions as possible can be executed in parallel.

It is an object of the invention to provide a method and apparatus for efficiently compiling code by exposing parallelism in that code. The present invention is applicable to any computer architecture having multiple functional units, for example, Very Long Instruction Word ("VLIW") architectures for implementing real-time implementations of Digital Signal Processing ("DSP") applications.

It is a further and more specific object of the invention to determine and represent dependencies for each of the memory accesses in a source program. This exposes the execution paths in the program so that the compiler can exploit the parallelism to the maximum extent. In the case of VLIW architectures, the failure to detect parallelism accurately can lead to fewer instructions being packed into a VLIW instruction word and hence the processor performing below its capabilities.

Index expressions present special problems for compilers. Consider the following piece of pseudo-code:

```
1 void f(
2 double A[4]
3 )
4 {
5 double a = A[0];
6 double b = A[1];
7 double c = a + b;
8 A[0] = c;
9
10 double d = A[2];
11 double e = A[3];
12 double f = d − e;
13 A[2] = f;
14 }
```

The block code starting with "double a=A[0]" can be executed in parallel with the code starting with "double d=A[2]" since they do not access the same memory locations in array A.

Now consider the following example of more complex parallelism:

```
1 double f(
2 double in
3 )
4 {
5 double A [16];
6 A [0] = in;
7 for (int i=0;i<16;i++) {
8 A [i+1] = A[i] * 2.0
9 }
10 return A[15];
}
```

The indices for array A are now linear index expressions of the loop iterators (the linear expressions are i, i+1 and loop iterator i). The term "linear" as applied to an index expression means that the index expression is the result of a combination of a constant times the iterator plus a constant. This information can be used to determine if multiple iterations of a loop can be run in parallel—referred to as "array privatization." In this example, the compiler can tell that the array value is produced in the previous iteration. It therefore cannot postpone the write operation until after the read of the next iteration.

Now consider the following example involving an induction variable (which is behaviorally equivalent to the previous example):

```
1 double f(
2 double in
3 )
4 {
5 double A[16];
6 A[0] = in;
7 int idx1 = 1;
8 int idx2 = 0;
9 for (int i=0;i<16;i++) {
10 A[idx1] = A[idx2] * 2.0
11 idx1 = idx1 + 1;
12 idx2 = idx2 + 1;
13 }
14 return A[15];
15
```

In this expression, a variable is initialized before a loop. The value used and updated inside the loop is called an induction variable. In some cases the induction variable can be converted into a linear index expression and the parallelism in the code thus exposed. This is the case here because the code is completely equivalent to that of the previous example.

Known methods of compiler optimization only consider linear index expressions—assuming a worst case of non-parallelism for non-linear expressions. Induction variables are handled by transformation into linear index expressions. Most systems of the prior art use heuristic approaches to obtain memory access information from such expressions. Prior art algorithms formulate the linear index expressions and a specific data flow analysis question as the proof of the existence of a solution of an Integer Linear Programming problem. Another known method for simplifying the Integer Linear Programming problem is Fourier-Motzkin variable elimination, which reduces the number of dimensions of the problem.

The present invention does not rely on linear index expressions, nor on Integer Linear Programming. Instead it transforms the relevant pieces of the source program into a data structure suitable for symbolic execution, performs the symbolic execution and extracts, from the data generated during the symbolic execution, the relevant combinations of index values. That is to say, the correct range that a particular index expression can take is computed by the symbolic execution and not defined through Integer Linear Programming.

The present invention thus has, among other benefits, the ability to handle the optimization of code involving non-linear index expressions as well as lookup tables and conditional updates.

These and other advantages of the invention will be apparent from the following description and claims.

SUMMARY OF THE INVENTION

The present invention relates to a method of compiling a computer program, the program comprising a plurality of operations having a sequence. The method involves extracting from the computer program, information describing the operations and the sequence of the operations and storing the extracted information as a data structure. The operations in the computer program which involve index expressions are identified and those operations are executed, producing information describing memory accesses. The operations which can be executed in parallel are identified, based on the information describing memory accesses.

In a further embodiment, the method includes a step of generating a symbolic execution data structure comprising a representation of the operations in the computer program which involve the memory accesses and index expressions. The symbolic execution data structure may be a data flow problem graph. In yet a further embodiment, the method of the present invention involves executing the operations by executing the symbolic execution data structure and noting memory locations addressed by the computer program. A question data structure is generated containing questions relating to how the computer program accesses memory. The computer program is analyzed by interrogating the computer program with the questions. The answers to the questions are back annotated into the question data structure. In a further embodiment, index sets relating to memory access by the operations of the program which involve index expressions are generated. The answers to the questions are computed based on information accumulated in index sets during the symbolic execution step. The index sets are thus filled in the symbolic execution step.

The invention further encompasses an apparatus for compiling computer code, having first signal flow analysis module which creates a signal flow data structure for index expressions used by the computer code. The signal flow analysis module comprises a module which identifies an index path in the computer code. The index path is made up of operations involved in computing indices used in memory accesses by index expressions. A symbolic execution module executes the index path, thereby extracting information relating to index expression memory accesses.

In a further embodiment, the apparatus includes a question database containing questions relating to memory accesses by index expressions. A module generates index sets made up of responses to questions in the question database. A module generates answers to the questions in the question database based upon the contents of the index sets.

DETAILED DESCRIPTION OF THE PREFERRED EMBODIMENT

The following is a detailed description of the preferred embodiment, which will enable a person of ordinary skill in the art to make and use the invention. The description is intended to be illustrative rather than limiting of the invention, the full scope of which is to be determined by reference to the appended claims and their equivalents. Persons of ordinary skill in the art will recognize that a wide range of alternative embodiments of the invention is encompassed by the invention.

The invention provides a method and apparatus for efficient compilation of a source code program for use in a computer architecture which produces an efficient compiled code, allowing operations to be executed in parallel, for example in a Very Long Instruction Word ("VLIW") architecture. The aim of the invention is to produce a signal flow graph ("SFG") which exposes as much parallelism in the input source code as possible. An SFG is a data structure representing an algorithm and used to assist in the compilation of code. The SFG is a commonly used and convenient way of representing dependencies in a program by means of data edges (which route data between operations) and sequence edges (which impose order relations between operations) through a program. An example of the use of an SFG data structure is described in DSP Station SFG Concepts and Procedural Interface (Software Version 8.6.1) produced by Frontier Design, b.v.b.a. of Leuven, Belgium. It will be recognized by those of ordinary skill in the art that, the same results can be achieved by other means such as alternative representations of data and sequence information. It is intended that the term SFG imply any such representation.

Figure 1:
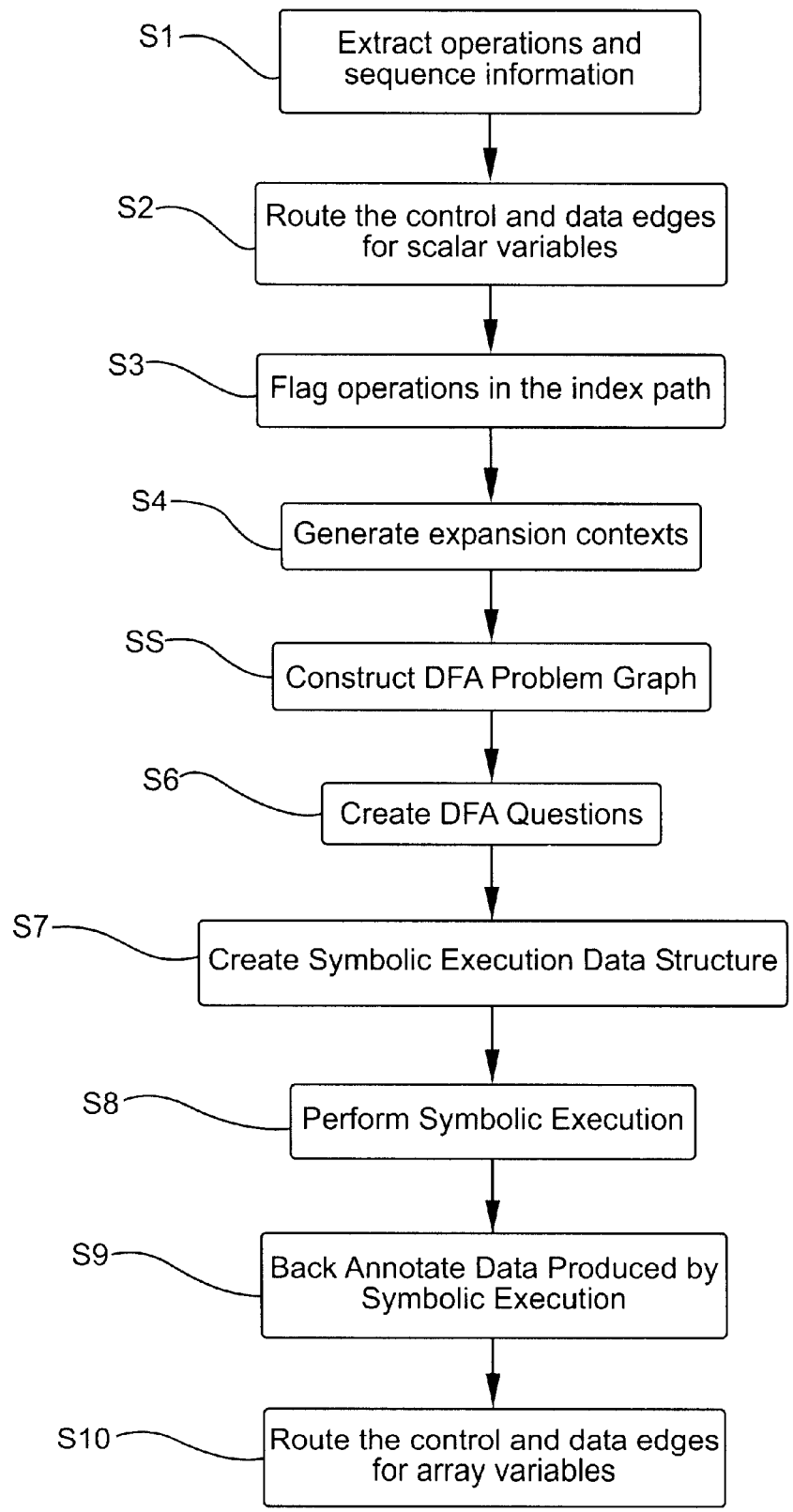
FIG. 1 is a flowchart showing the basic method of the invention.

The following description assumes source code comprising operations involving scalar and array variables as well as an index path made up of operations that are involved in the computation of indices of memory operation. The basic steps in the data flow analysis are shown in FIG. 1 and are summarized as follows:
1. Extract the program operations and the information about the sequence of those operations from the source code (S1).
2. Route the control and data edges between operations for scalar variables (S2). Accessing a scalar variable (i.e. reading or writing) consumes (read) or produces (write) the entire variable. Classic data flow analysis can handle this situation. However, classic data flow analysis does not assist in optimization where arrays are concerned, particularly in cases involving non-linear indices.
3. Flag all operations in the index path (S3).
4. Generate "expansion contexts" (S4). If a function has a function call which has been flagged in step 2, then a data structure is generated which enables subsequent stages of the algorithm to "see" that function's operations as if the operations in the function were "inlined" in the calling function's context.
5. Construct the DFA Problem Graph (S5). This removes and flattens the hierarchies in the index path, for example, due to function calls involving index variables. The DFA Problem Graph has nodes which relate to memory accesses and operations in the index path.
6. Create a set of questions relating to memory access ("DFA questions") which can be posed by the data and sequence flow router in a subsequent phase (S6). The questions are generated for relevant triplets of loop, memory access 1 and memory access 2. These questions are stored in a DFA question database.
7. Create a symbolic execution data structure (S7). This contains data structures necessary to accumulate or hold information about all memory accesses.
8. Perform a symbolic execution of the source code (S8).
9. Back annotate the data produced by the symbolic execution to the DFA question data base (S9). In the case of expanded function calls, this stage merges the symbolic execution data generated by all the function invocations.
10. Route the control and data edges between operations for array variables using the answers to the DFA questions (S10).

Figure 2:
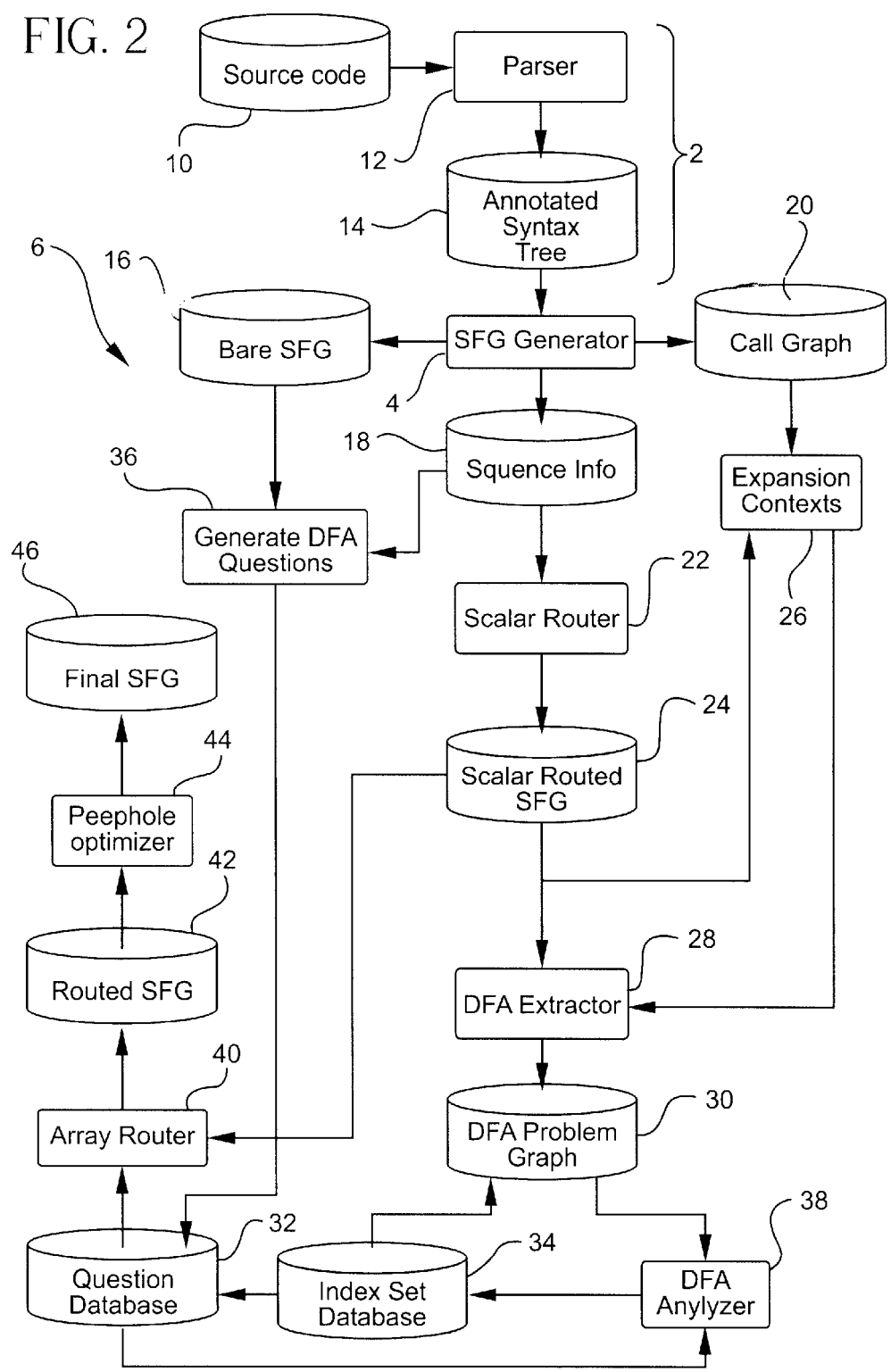
FIG. 2 is a block diagram showing the basic components of the invention and the interactions between them.

These steps will now be described in detail with particular reference to FIG. 2 and to the following pseudo code which serves as an example to aid in the description of the invention.

```
1 #define N 10
2
3 void fibonacci(
4 int fibo[N]
5 )
6 {
7 #pragma OUT(fibo)
8 int i;
9 fibo[0] = 1;
10 fibo[1] = 1;
11 for (i = 2; i < N; i++) {
12 // the feedbackset with looping degree GT one for fibo[i] to fibo[i-1]
13 // with respect to loop i is empty, for fibo[i-2] it's not empty and
14 // this causes a feedthrough edge
15 fibo[i] = fibo[i-1] + fibo[i-2];
16 }
17 }
18
```

The following description will make reference to this code and to the representations of data structures which relate to the code. FIGS. 5, 6 and 8–16 provide graphical representations of the analysis of the above code using the invention in a manner which will be well understood by persons of ordinary skill in the art.

Front end 2 receives the source code 10 as an input, performs lexical analysis by means of parser 12 and produces an intermediate level language representation of the source code in the form of annotated syntax tree 14.

Annotated syntax tree 14 is input to Signal Flow Graph Generator 4. Signal Flow Graph Generator 4 first checks the source code to determine if it is capable of synthesis. If so, it traverses the syntax tree (S1 and S2 in FIG. 1) to produce the SFG data structure.

SFG generator 4 produces the following outputs: Bare SFG 16, Sequence Information 18 and Call Graph 20. Bare SFG 16 is an SFG which represents all the operations in source code 10, but does not include any data or sequence edges linking the operations. The bare SFG thus contains an unscheduled set of operations. An example of a bare SFG can be found in FIG. 3.

Sequence information 18 is a list which contains information about the lexical order and exclusivity of the different operations in the bare SFG. The exclusivity is derived from conditional statements in the source code. In a language such as C, these are the if-then-else statements, case statements and ? operators. The following is the sequence information for the above mentioned pseudo code example and of bare SFG shown in FIG. 3:

| VAR | TYPE | Operation:Port | Remark | Source |
|---|---|---|---|---|
| t1 | OutputPort | Sfg_constantOp(1):out0 | | 1 |
| | InputPort | Sfg_storeOp(5):in0 | data | fibo [0] = 1 |
| t2 | OutputPort | Sfg_constantOp(2):out0 | | 0 |
| | InputPort | Sfg_storeOp(5):in1 | index | [0] |
| t3 | OutputPort | Sfg_constantOp(3):out0 | | 1 |
| | InputPort | Sfg_storeOp(6):in0 | data | fibo [1] = 1 |
| t4 | OutputPort | Sfg_constantOp(4):out0 | | 1 |
| | InputPort | Sfg_storeOp(6):in1 | index | [1] |
| t5 | OutputPort | Sfg_constantOp(5):out0 | | 3 |
| | InputPort | Sfg_loopOp(6):in0 | low | 1=2 |
| t6 | OutputPort | Sfg_constantOp(8):out0 | | 10 |
| | InputPort | Sfg_loopOp(9):in1 | high | i<10 |
| 1 | OutputPort | Sfg_sourceOp(10):out0 | | For iterator |
| | InputPort | Sfg_subtractOp(12):in0 | | argument of i-1 |
| | InputPort | Sfg_subtractOp(14):in0 | | argument of i-2 |
| | InputPort | Sfg_storeOp(18):in0 | index | [i] |
| t7 | OutputPort | Sfg_constantOp(11):out0 | | 1 |
| | InputPort | Sfg_storeOp(12):in1 | | argument of i-1 |
| t8 | OutputPort | Sfg_subtractOp(12):out0 | | i-1 |
| | InputPort | Sfg_fetchOp(15):in1 | index | [i-1] |
| t9 | OutputPort | Sfg_fetchOp(15):out0 | | fibo[i-1] |
| | InputPort | Sfg_addOp(15):in0 | | fibo[i-1] + .. |
| t10 | OutputPort | Sfg_constantOp(13):out0 | | 2 |
| | InputPort | Sfg_subtractOp(14):in1 | | argument of i-2 |
| t11 | OutputPort | Sfg_subtractOp(14):out0 | | i-2 |
| | InputPort | Sfg_fetchOp(16):in1 | index | [i-2] |
| t12 | OutputPort | Sfg_fetchOp(16):out0 | | fibo[i-2] |
| | InputPort | Sfg_addOp(16):in1 | | .. + fibo [i-2] |
| t13 | OutputPort | Sfg_addOp(17):out0 | | fibo[i-1] + fibo[i-2] |
| | InputPort | Sfg_storeOp(18):in0 | data | fibo[i] = .. |
| fibo | Store | Sfg_storeOp(5):out0 | | fibo[0] |
| | Store | Sfg_storeOp(6):out0 | | fibo[1] |
| | Fetch | Sfg_fetchOp(15):out0 | | fibo[i-1] |
| | Fetch | Sfg_fetchOp(16):out0 | | fibo[i-2] |
| | Store | Sfg_storeOp(18):out0 | | fibo[i] |
| | InputPort | Sfg_sinkOp(18):in0 | | output of fibonacci |

Function call graph 20 is a call tree representing function calls in source code 10. It is used in the "flattening" phase and caches information for all function calls in the source code. Every function in the source code is represented by a node in the tree and every function call is represented by an edge. In the bare SFG for the above example shown in FIG. 3, the "fibo" is the only function call. The following is an example of a more complex function call:

```
1 int bar(
2 int in
3 ) {
4 return in;
5 }
6 int foo(int in) {
7 int bar1 = bar(in);
8 int bar2 = bar(in);
9 return bar1 + bar2;
10 }
11 int main() {
12 int in = 1;
13 return foo(in);
14 }
```

Figure 4:
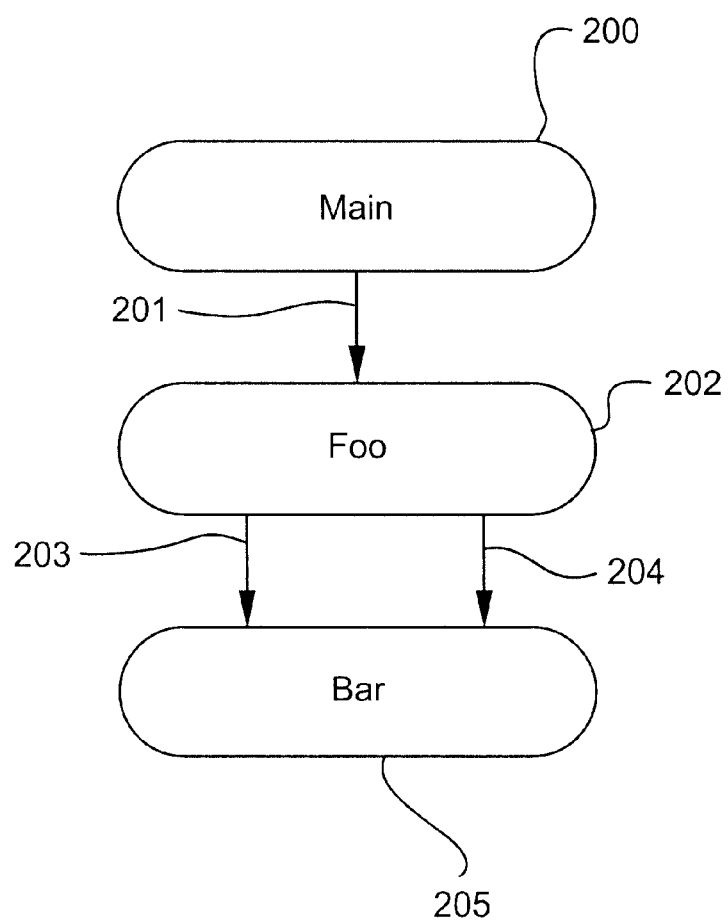
FIG. 4 is a function call graph for an example in the Detailed Description.

FIG. 4 is the function call graph for the foregoing code. It shows main program 200 calling function "foo" 202 (represented by edge 201) which in turn calls "bar" 205 twice (represented by edges 203 and 204).

Figure 5:
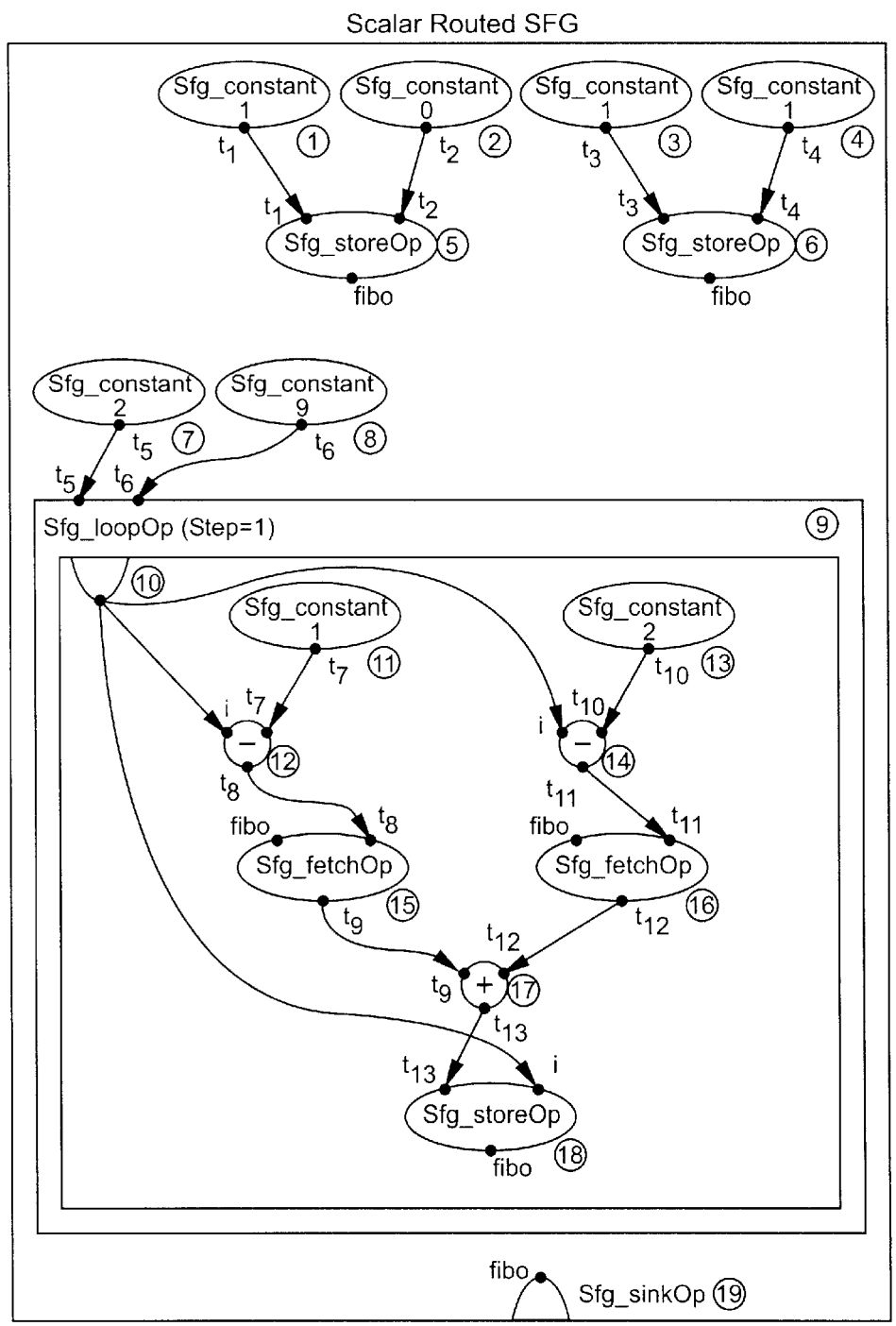
FIG. 5 is a signal flow graph showing the routing of data and sequence edges for scalar variables in the example in the Detailed Description.

Bare SFG 16 and sequence information 18 are fed into scalar router 22. Scalar router provides the routing of edges from one node in the bare SFG to another, using the sequence information 18 (see S2). This is only done for scalar variables. The result of the operation of scalar router 22 for our example is shown in FIG. 5. It can be seen in FIG. 5 that data and sequence edges have been added, linking all operations which relate to scalar variables. The resultant Scalar Routed SFG is produced at 24.

The non-scalar variables are now addressed. All operations in the index path are now flagged (see S3 in FIG. 1) to prepare for the "flattening" of the function hierarchy. The "index path" is made up of the nodes in the SFG that contribute to index ports on the graph, that is to say, all operations that are involved in the computation of indices used in memory access operations (fetch or store) or if the result is used in another operation which is in the index path. In our example, the index ports are marked with index "i". In cases such as a[i+j], the "+" operation together with the operations defining i and j are tagged as being part of the index path. See the shaded operations shown in FIG. 6.

Each operation has a flag indicating whether or not it is in the index path. The initial value of the flag is "false." Backtracking over the data edges from the index ports of all memory access operations (fetches and stores) will set the appropriate flags. The result of this step is shown for our example in FIG. 6.

The following pseudo code shows the steps involved in the marking of the index path.

```
1 PROCEDURE MARKINDEXPATH
2 BEGIN
3 FOR all operations O DO
4 IF (O is a memory access) THEN
5 FOR all indexports P of operations O DO
6 MARKINPUTPORT(P)
7 END
8 FI
9 END
10 END
11
12 PROCEDURE MARKINPUTPORT (P)
13 BEGIN
14 FOR all incoming dataedges D of P DO
15 Set fromport to the from port of D
16 MARKOUTPUTPORT (fromport)
17 END
18 END
19
20 PROCEDURE MARKOUTPUTPORT (P)
21 BEGIN
22 Mark the operation O to which P belongs as in the ipdexpath
23 FOR (all inputports I of O) DO
24 MARKINPUTPORT(I)
25 END
26 END
```

The next step is the inter-procedural optimization (that is to say, optimization with regard to variables in common between function calls). This involves the step of generation of expansion contexts for the flagged operations (see S4). As a result, every function in the function call graph data structure 20 will contain a list of "expansion contexts" 26. These are generated as follows: If a function has a function call which was flagged in the previous step (i.e. the marking of the index path), then a data structure is generated (an "expansion context") which prepares to represent the function in a "flat" form—that is to say, expanded in the main program. This is analogous to the C++ concept of an "inlined" function. The result is that the hierarchy of the function calls is removed. That is to say the hierarchy of the function calls involving the index path is flattened.

Each argument in the function call is examined for each call of that function. Note however that only functions with index inputs as arguments are examined. This yields the following information which makes up each expansion context: (1) the parent of the function, (2) the edge which calls the function and (3) a unique identifier for the function. The result is that the program is represented without reference to hierarchies introduced by function calls. DFA problem analysis can be performed on a flat data structure without any function hierarchy.

The following pseudo code provides an illustration of the generation of an expansion context.

```
1 PROCEDURE GENERATEEXPANSIONCONTEXTS
2 BEGIN
3 FOR all functions F DO
4 IF (F must be expanded) THEN
5 // i.e. one of the sources of F has been marked by the MARKINDEXPATH
6 // procedure
7 EXPAND(F)
8 FI
9 END
10 END
11
12 PROCEDURE EXPAND(F)
13 BEGIN
14 IF (F is the main function) THEN
15 Create the top expansion context (the root of the expansion context tree)
16 ELSE
17 FOR all functioncalls FC of F DO
18 Set FF to the function which contains FC
19 IF (FF must be expanded and FF is not expanded yet) THEN
20 EXPAND(FF)
21 FI
22 FOR all expansion contexts FFCONTEXTS of FF DO
23 create expansion context for FFCONTECT and FC
```

```
24 END
25 END
26 FI
27 END
```

The next step is the construction of the "DFA Problem Graph" (see S5 in FIG. 1), which describes the source code involved in memory accesses for non-scalar variables. This is performed by DFA extractor 28. The inputs to DFA extractor 28 are scalar routed SFG 24 and the expansion contexts obtained from the generation of expansion contexts 26. In an alternate embodiment, the DFA Extractor utilizes the information in sequence information data structure 18 and bare SFG data structure 16. The DFA Problem Graph 30 provides a "flat" representation in which hierarchies are removed. The DFA Problem graph 30 is a graph having nodes related to memory access and operations in the index path.

The starting points for the construction of the DFA Problem Graph are the read memory accesses (fetches) and write memory accesses (stores) in the index path. From these nodes, the data flow is traced back through those nodes that are supported by the symbolic execution engine. The supported index path operations are as follows:

arithmetic operators: modulo (%), shift left (<<), shift right (>>), divide (/), add (+), casts (type conversions/promotions), subtract (−), multiply (*), bitwise and (&), bitwise inclusive or (|), bitwise exclusive or (^), one's complement operator (~), unary minus (−), unary plus (+).

logical operators: less-or-equal (<=), less (<), equal (==), not equal (!=), greater or equal (>=), greater (>), logical-and (&&), logical or (||), logical negation (!).

loop iterators.

constants.

bit operators: slice (selecting a range of bits from a given word), setslice (setting a range of bits in a word), concat (appending bits to form a new word).

look up tables (fetches from constant tables).

induction variables: variables whose values form an arithmetic progression during the execution of the loop.

If a node is not supported, then it will not be represented in the DFA Problem Graph and nodes which depend on the unsupported node will be invalidated. The consequences of this will only be seen later, that is to say, for memory accesses dependent on unsupported nodes worst-case assumptions will be made, possibly restricting the amount of parallelism.

Figure 7:
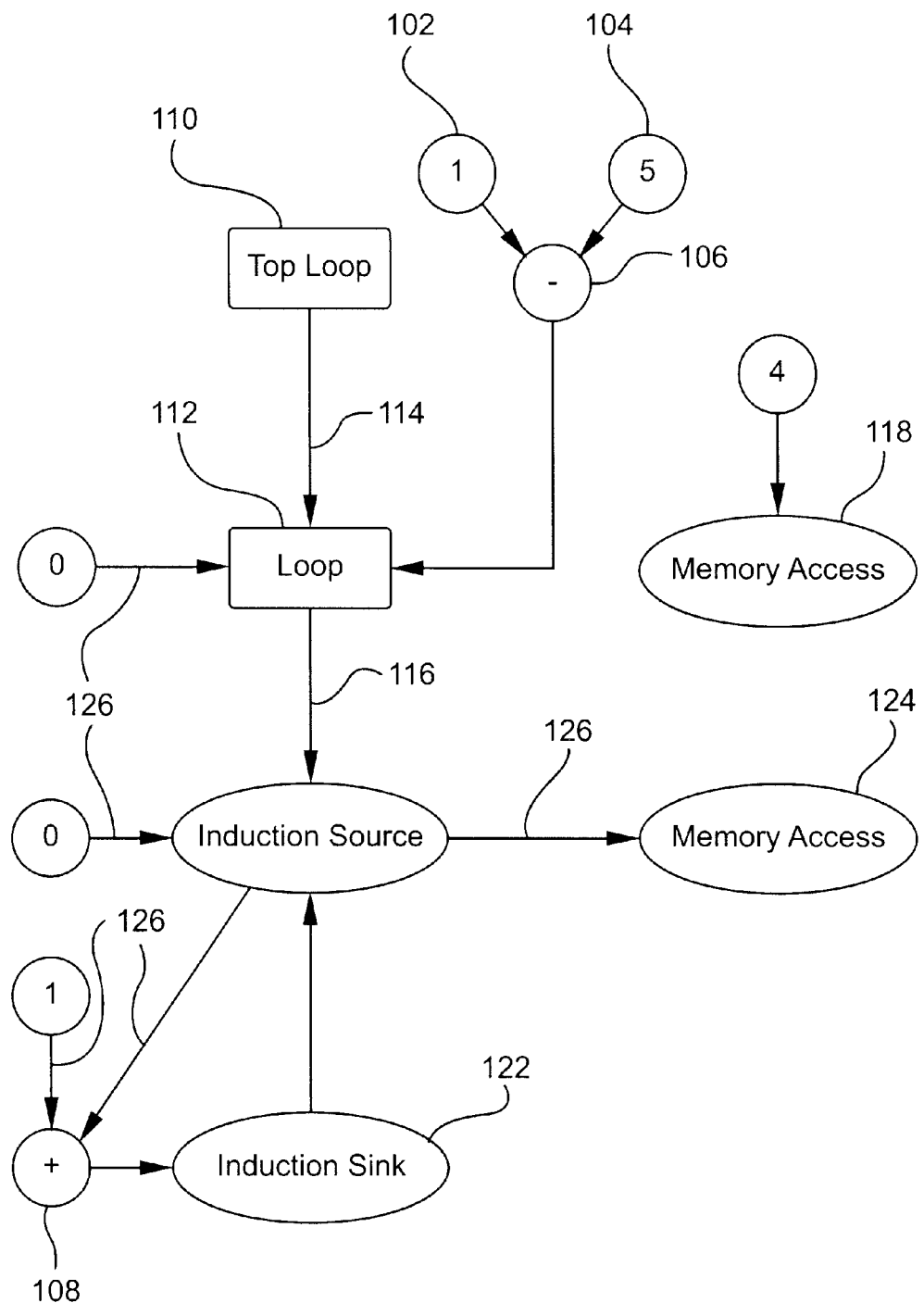
FIG. 7 is an example of a DFA Problem Graph as used in the present invention.

A DFA Problem Graph is shown in FIG. 7. The graph in FIG. 7 is the DFA Problem Graph for the following pseudo code example:

```
1 #define N 5
2
3 int inductionsource()
4 {
5 int idx,i;
6 int data[N];
7 idx = 0;
8 for (i = 0; i<N; i++) {
9 data[idx] = i;
10 idx = idx + 1;
11 }
12 return data[N−1];
13
```

The data structure representing the DFA Problem contains the following components, illustrated in FIG. 7.

constant nodes 102, 104—these are nodes with a single output and a constant inside.

arithmetic and logical nodes 106, 108—these are nodes with one or more inputs and an output and which represent the arithmetic and logical operators described above.

top loop 110—the program itself.

loop node 112—these have lower and upper bounds and a step value for the loop iterator. The loop has a nesting edge 114 (to a loop nested in the top loop) which represents the loop hierarchy and a list of induction variables for that loop, represented by induction loop edge 116 (i.e. the loop controls the variable).

look up table—this is a node representing constant tables and the memory reads (fetches) from those constant tables (not shown in FIG. 7).

selectors—these are counterparts of if then else statements. They are analogous to hardware multiplexers selecting one of two inputs depending on a boolean selector value (these are not shown in FIG. 8).

induction variables—induction variables are represented by an induction source node 120 (which holds the value at the start of the loop iteration) and an induction sink 122 (which holds the value at the end of the loop iteration for subsequent use in the following loop iteration).

memory accesses 124—this represents the read/write memory accesses (fetches/stores) to variables.

data edges 126—these represent the transport of data between nodes.

Figure 8:
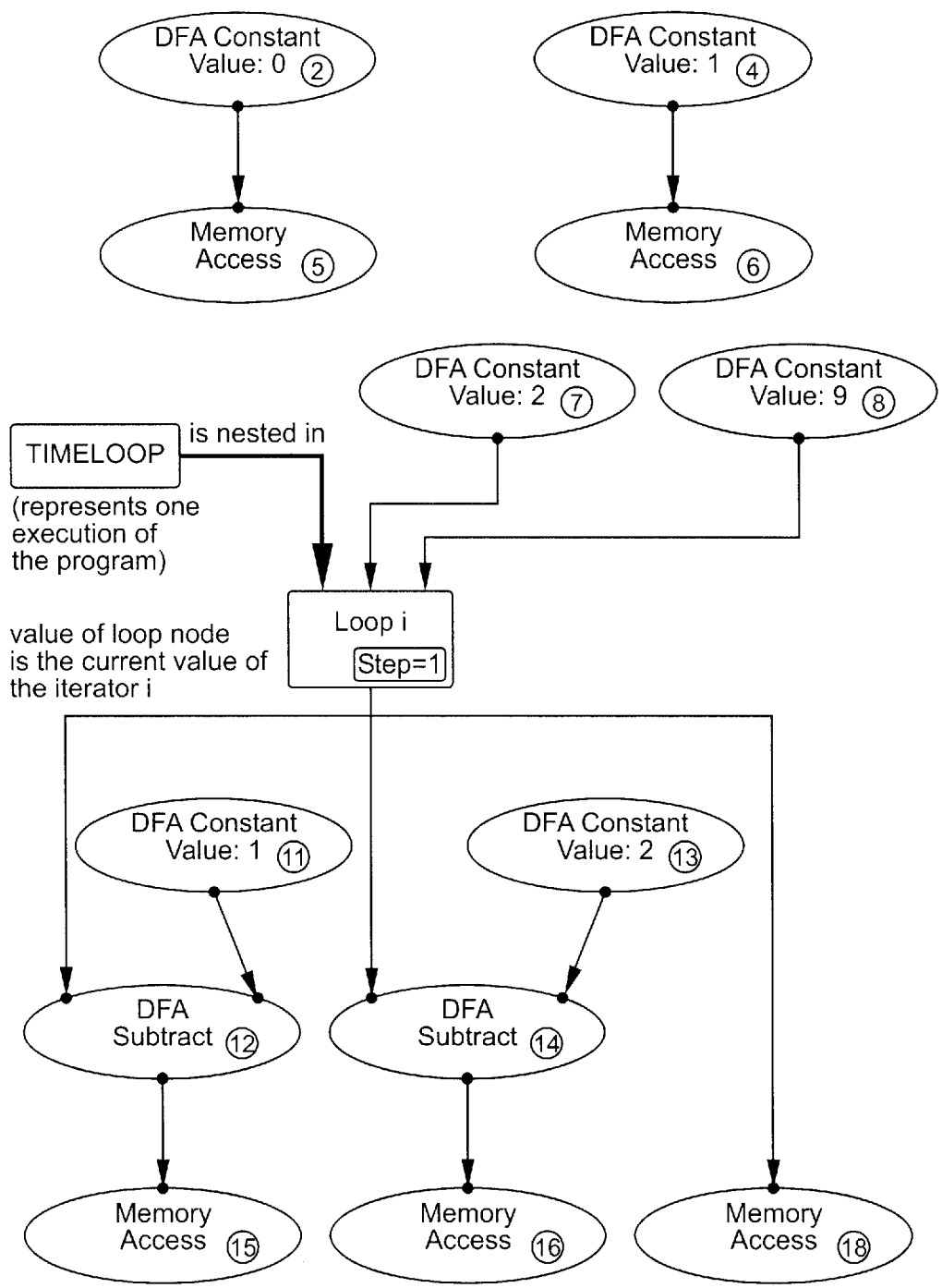
FIG. 8 is the DFA Problem Graph for the example in the Detailed Description.

The DFA Problem Graph for the example code is shown in FIG. 8. The following pseudo code represents the generation of the DFA Problem Graph:

```
1 PROCEDURE DERIVEDFAPROBLEMGRAPH
2 BEGIN
3 IF ( inter-procedural analysis needs to be performed ) THEN
4 //
5 FOR ( all functions F ) DO
6 IF (F has been expanded) THEN
7 FOR (all instances I of F) DO
8 set I as the current function instance
9 DERIVEPROBLEMGRAPHFOR (F)
10 END
11 ELSE
12 DERIVEPROBLEMGRAPHFOR(F)
13 FI
14 END
15 ELSE
16 FOR ( all functions F ) DO
17 DERIVEPROBLEMGRAPHFOR (F)
18 END
19 FI
20 END
21
22 PROCEDURE DERIVEDFAPROBLEMFORFUNCTION (F)
23 BEGIN
24 FOR (all non-scalar memory accesses M in the function F) DO
```

-continued

```
25 FOR (all indices I of the memory access M) DO
26 PROCESSINPUTPORT (I)
27 FOR (each induction source IS created during the processing of I)
   DO
28 // Processes the code which update the IS during an iteration of
29 // the loop
30 PROCESSINPUTPORT (feedbackinputport of IS)
31
32 IF (the feedback inputport was processed successfully) THEN
33 create induction sink linked with IS having the DFA node
34 created during the processing of the feedback inputport as
35 update node. (i.e. the value coming out of the update node is
36 the value of the induction variable in the next loop iteration)
37 FI
38 END
39 IF (one of the induction variables was not successfully processed)
   THEN
40 invalidate all induction sinks created
41 FI
42 IF (I was not successfully processed) THEN
43 quit processing indices of M
44 FI
45 add DFA node corresponding with I to DFAI list
46 END
47 IF (all indices successfully processed) THEN
48 create memory access node for M with indices DFAI
49 FI
50 END
51 END
52
53 PROCEDURE PROCESSINPUTPORT (I)
54 BEGIN
55 Let O be the operation producing data for I
56 IF ( O is a constant operation ) THEN
57 create a constant DFA node and set is as the corresponding
   problem graph
58 node of I
59 ELSIF (O is an arithmetic/logical operation) THEN
60 FOR (all inputports IP of O) DO
61 do PROCESSINPUTPORT(I)
62 END
63 IF (all the inputports of O have been successfully processed)
   THEN
64 create an arithmetic/logical DFA node with the
65 processed inputports as arguments and set is as the corresponding
66 DFA node of the inputport I
67 ELSE
68 mark the inputport I as having been unsuccessfully processed
69 FI
70 ELSIF (O is a functioncall) THEN
71 IF (inter-procedural analysis needs to be performed ) THEN
72 push O on the functioncall processing stack
73 set the calledfunction as the current function instance
74 set defport as the corresponding inputport of the sink in the
   calledfunction
75 IF (PROCESSINPUTPORT (defport) is successfull) THEN
76 set the dfa node corresponding with defport as the dfa node of I
77 ELSE
78 mark the inputport I as having been unsuccessfully processed
79 FI
80 ELSE
81 mark the inputport I as having been unsuccessfully processed
82 FI
83 ELSIF (O is a source) THEN
84 IF (O is the source of a function) THEN
85 IF (inter-procedural analysis needs to be performed) THEN
86 IF (the function call processing stack is not empty) THEN
87 pop the functioncall FC from the functioncall processing stack
88 set the function which contains FC as the current function instance
89 set defport as the correspondinginputport of FC for O
90 IF (PROCESSINPUTPORT (defport) is successfull) THEN
91 set the dfa node corresponding with defport as the dfa node of I
92 ELSE
93 mark the inputport I as having been unsuccessfully processed
94 FI
95 FI
96 ELSE
97 mark the inputport I as having been unsuccessfully processed
98 FI
```

-continued

```
99 ELSIF (O is the source of a loop) THEN
100 IF (O is the loopiterator) THEN
101 PROCESSINPUTPORT (lowerbound of loopiterator)
102 PROCESSINPUTPORT (uppperbound of loopiterator)
103 IF (lowerbound and upperbound of loopiterator successfully
    processed) THEN
104 Create dfa loop node with processed lower and upper bound
    nodes as argument
105 ELSE
106 mark the inputport I as having been unsuccessfully processed
107 FI
108 ELSE
109 // Induction source ?
110 IF (PROCESSINPUTPORT (corresponding loop inputport for O) )
    THEN
111 Create an induction source for O and attach it to the loop
112 ELSE
113 mark the inputport I as having been unsuccessfully processed
114 FI
115 FI
116 ELSIF (O is the source of a block) THEN
117 IF (PROCESSINPUTPORT (corresponding block inputport for
    O) ) THEN
118 set the dfa node of the corresponding block inputport as the
    dfa node of I
119 ELSE
120 mark the inputport I as having been unsuccessfully processed
121 FI
122 FI
123 ELSIF (O is a loop) THEN
124 set defport as the correspondinginputport of I for O
125 IF (PROCESSINPUTPORT (defport) is successfull) THEN
126 IF (defport is a feedback construct) THEN
127 IF (the feedback port has been successfully processed) THEN
128 Create an inductionsink node for defport and link it with the
129 processed node of the feedback port (induction source)
130 set the dfa node corresponding with defport as the dfa node of I
131 ELSE
132 mark the inputport I as having been unsuccessfully processed
133 FI
134 ELSE
135 set the dfa node corresponding with defport as the dfa node of I
136 FI
137 ELSE
138 mark the inputport I as having been unsuccessfully processed
139 FI
140 ELSIF (O is a block) THEN
141 // Go inside the block
142 set defport as the correspondinginputport of I for O
143 IF (PROCESSINPUTPORT (defport) is successfull) THEN
144 set the dfa node corresponding with defport as the dfa node of I
145 ELSE
146 mark the inputport I as having been unsuccessfully processed
147 FI
148 FI
149 END
```

The next step is the creation of the DFA questions (see S6 in FIG. 1). They are generated by DFA Question Generator 36 based on information provided by Bare SFG 16 and Sequence Information 18, and asked for relevant triplets of fetch, store and loop in the index path. The DFA questions are stored in the Question Database 32. The questions are aimed at ascertaining whether one operation feeds another (and hence cannot be executed in parallel with that other operation). Once the questions are answered, the bare SFG can be completed with data and sequence edges. The following questions are asked:

does a definition reach a specific point? A definition is killed by another one when there is no data flow from the killed definition to the points that are reached in the killing definition. Consider the following examples:

```
i  int killscalar()
2  {
3    int a;
4    int i;
5    for (i=0; i<2; i++) {
6      a = 1;
7      a = 2; /* a=1 is KILLed because a is redefined here */
8    }
9    return a; /* There is no dataflow here from the a=1 statement */
10 }
```

A killed definition can be a "killed scalar definition" for example a=1 and a=2 (a=1 is killed because it is redefined). The following is an example of a non-killed scalar definition:

```
1  int killscalar(int cond)
2  {
3    int a;
4    int i;
5    for (i=0; i<2; i++) {
6      a = 1;
7      if (cond) {
8        a = 2; /* a=1 NOT KILLed since a is conditionally update here */
9      }
10   }
11   return a;
12 }
```

A "non-killed scalar definition" occurs when for example a scalar is conditionally updated. The same applies to a "killed array definition," for example a[i]=1 is killed if followed by a[i]=2 in the following code:

```
13 #define N 10
14 int killarray()
15 {
16   int a [N];
17   int i;
18   for (i=0; i<N; i++) {
19     a[i] = 1;
20     a[i] = 2; /* a[i]=1 is KILLed because a[i] is redefined here */
21   }
22   return a[N-1];
23 }
``` is a definition a single definition? If an access is defined more than once inside a loop (over all iterations of the loop), then the definition will possibly overwrite data from previous iterations in the loop and a feedback sequence edge has to be added to the loop body. Accesses from future iterations must be performed after the access of the current iteration. The following is an example involving a single definition:

```
24 #define N 10
25
26 int singledef()
27 {
28   int i;
29   int data[N],data2[N];
30
31   for (i=0; i<N; i++) {
32     data1[i] = i; /* SINGLE DEFINITION */
33     data2[i%2] = i; /* MULTIPLE DEFINITION */
34   }
35   return data1[N-1] + data2[1];
36
``` are the memory accesses disjoint? If operations act on different parts of the memory they are disjoint. No sequence or data flow edges must be created. This means that memory accesses can be performed in parallel. The following is an example involving disjoint memory accesses:

```
37 #define N 10
38
39 int disjoint()
40 {
41   int data[N*2];
42   int i;
43   for (i=0; i < N; i++) {
44     data[2*i] = i; /* TWO parallel paths exist */
45     data[2*i+1] = i;
46   }
47   return data[2*N -1] + data[2*(N-1)];
48 }
49
``` does data flow from one iteration to the next iteration? If data produced in one iteration is consumed in the next iteration, then feedback data edges must be created. Production in the current iteration must be performed before consumption in the next iteration or iterations can be performed. The following is an example of feedback over one iteration.

```
50 #define N 10
51 int arrayfeedback()
52 {
53   int a[N];
54   int i;
55   a[0] = 0;
56   for (i=1; i<N; i++) {
57     a[i] = a[i-1]; /* data produced in this iteration consumed the next iteration */
58   }
59   return a[N-1];
60 }
``` does data flow from a current iteration to the nth iteration? If data produced in the current iteration is consumed only in the nth iteration, the data originating at the feedback source (where n=1) must also be fed forward to the corresponding feedback sink. The feed forward indicates that data will be used in some next iteration and as such the production in the current iteration must be performed before consumption in any of the future iterations can be performed.

The following is an example showing feedback over n iterations where n=2:

```
61 #define N 10
62 int arrayfeedbackandfeedforward()
63 {
```

```
64 int a[N];
65 int i;
66 a[0] = 0;
67 a[1] = 1;
68 for (i=2; i<N; i++) {
69 a[i] = a[i-2]; /* a[i] is fed back and the fed back data is fed forward
70 to future iterations */
71 }
72 return a[N-1];
73 }
74
```

Figure 3:
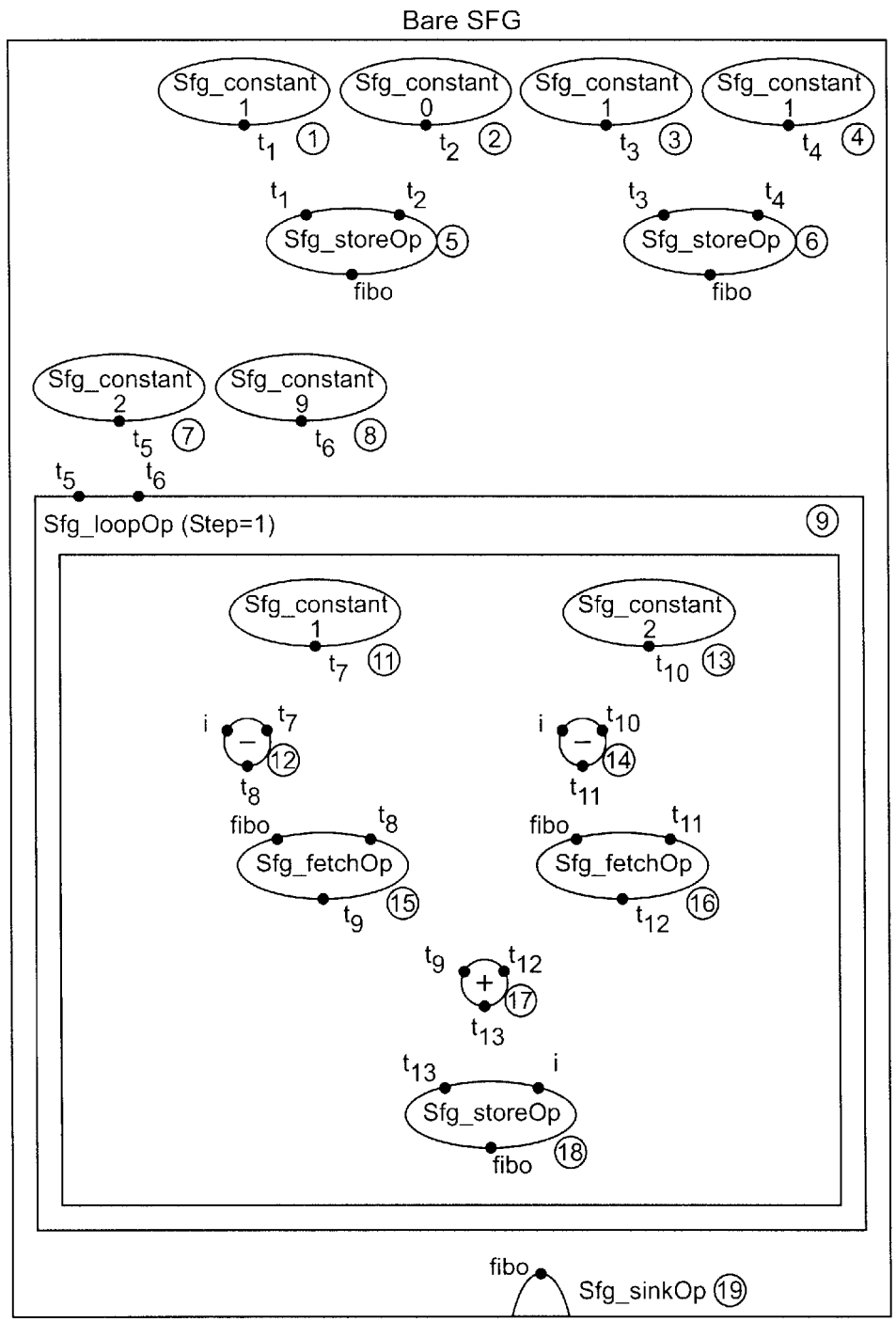
FIG. 3 is a signal flow graph ("SFG") of nodes representing the operations in the pseudo code example in the Detailed Description.
Figure 6:
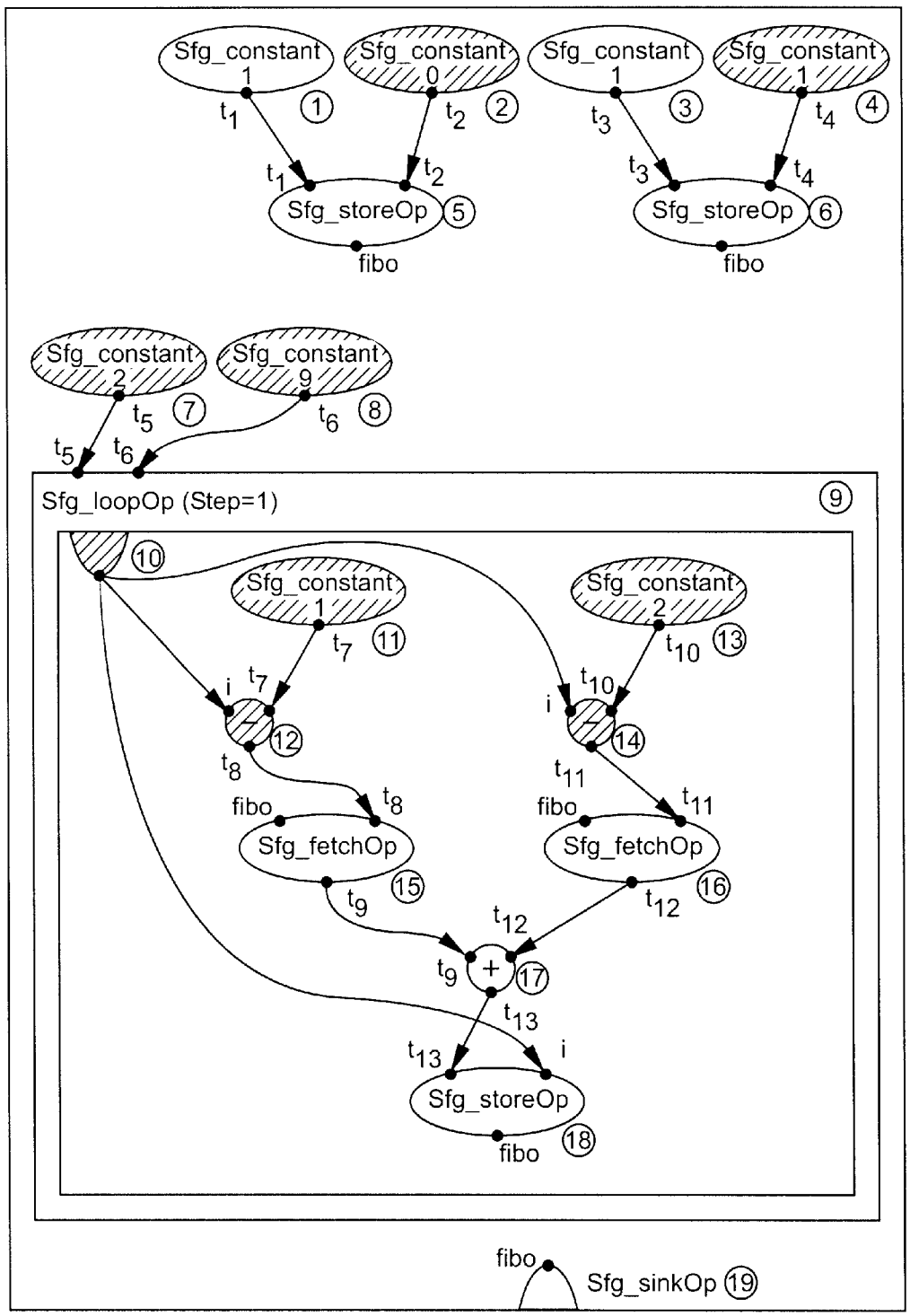
FIG. 6 is a signal flow graph for the example in the Detailed Description, showing the marking of the index path of the program.
Figure 9:
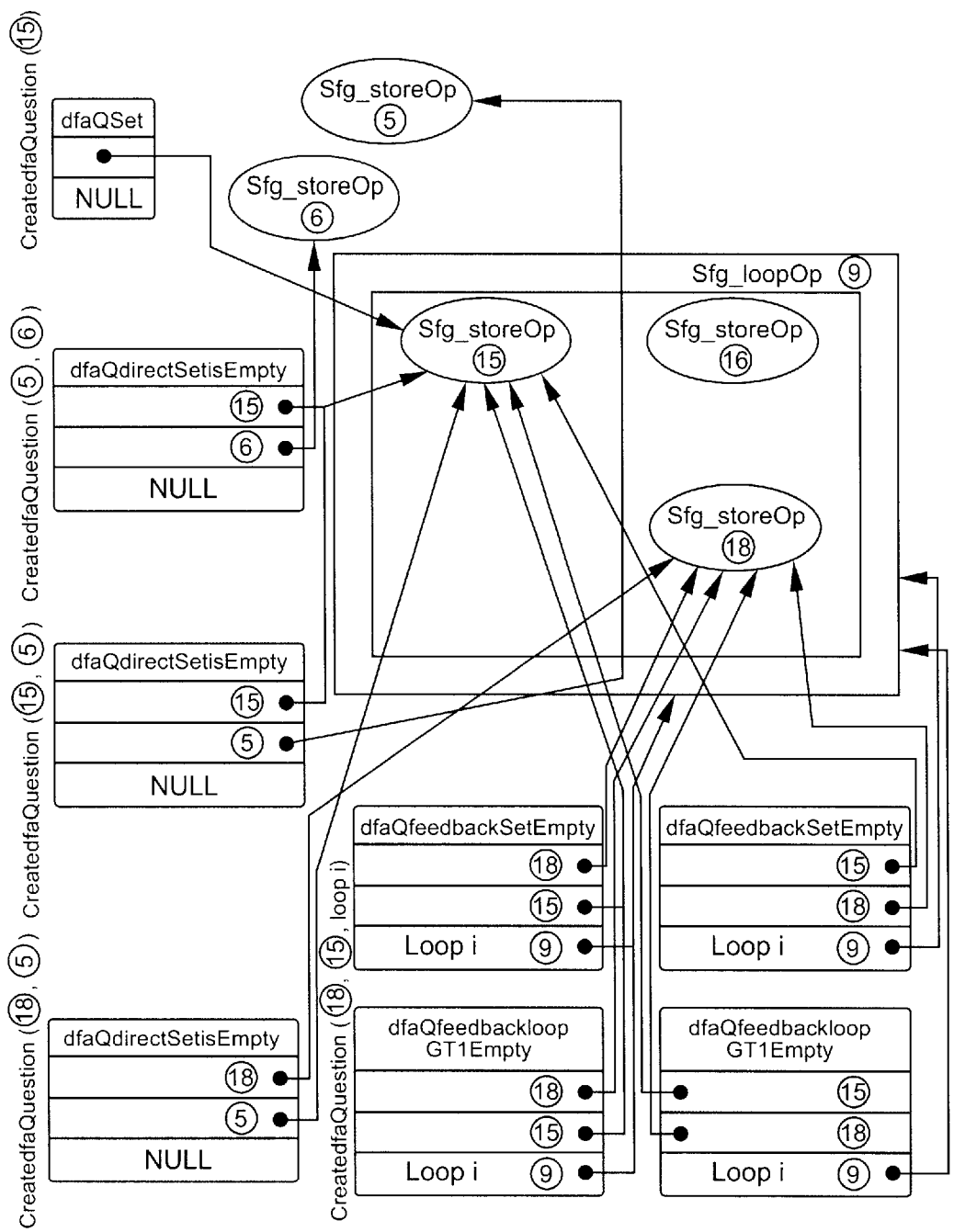
FIG. 9 is a snapshot of DFA questions for one function call in the example in the Detailed Description.
Figure 10:
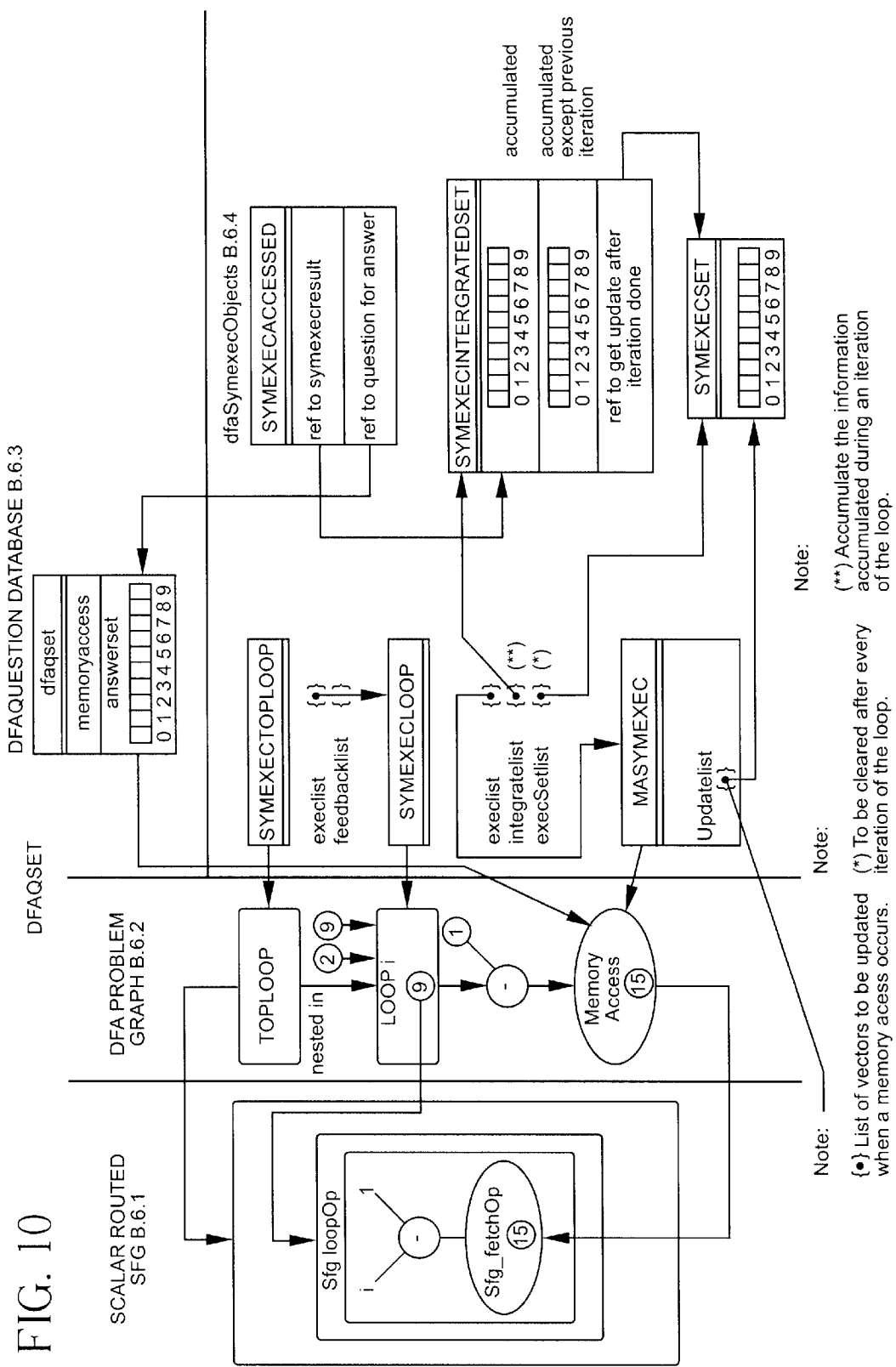
FIGS. 10–15 are graphical representations showing a set of DFA questions in the context of the DFA Problem Graph shown in FIG. 8, the DFA Question database and the symbolic execution data structure in the example in the Detailed Description.
Figure 11:
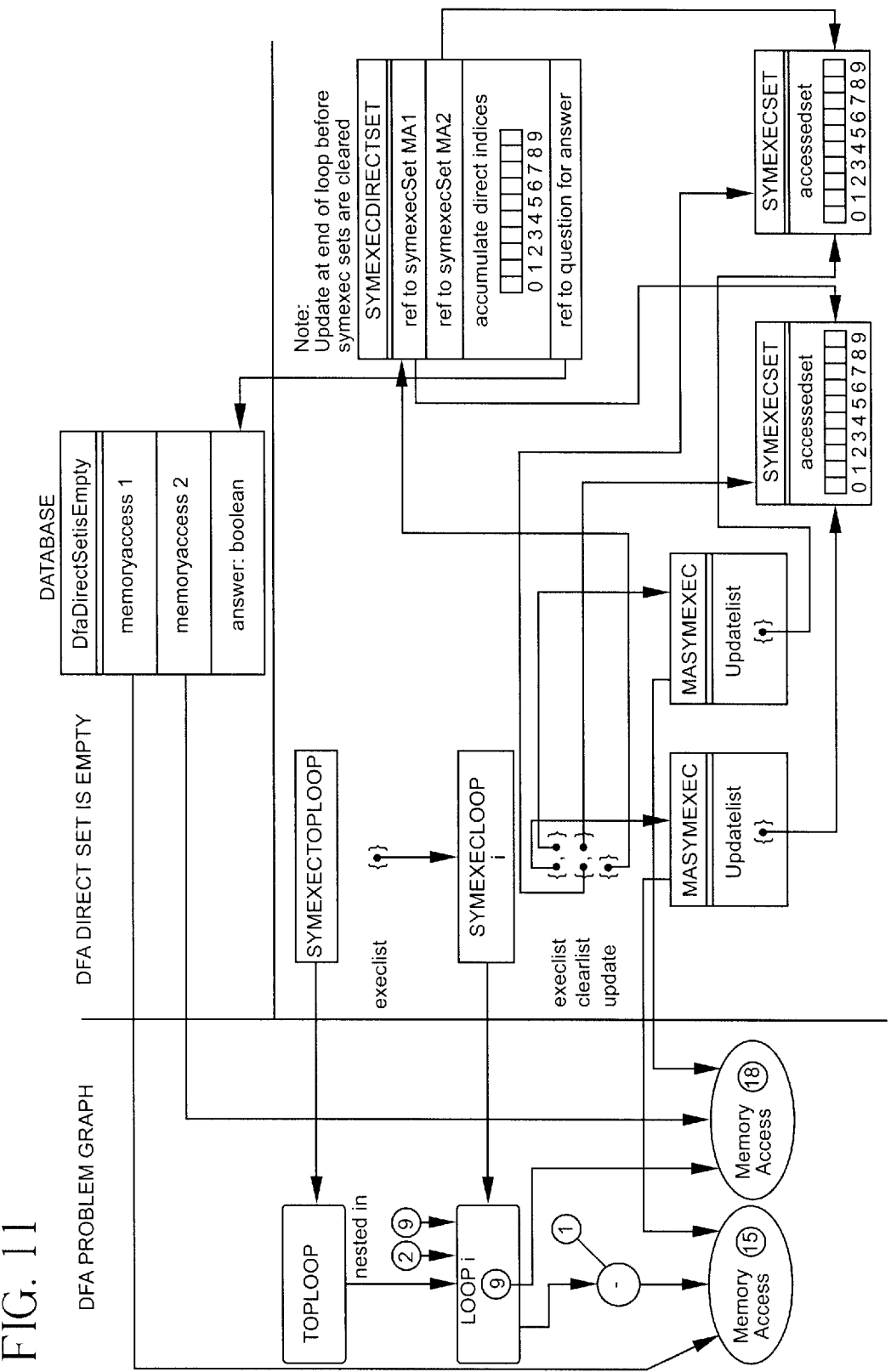
Figure 12:
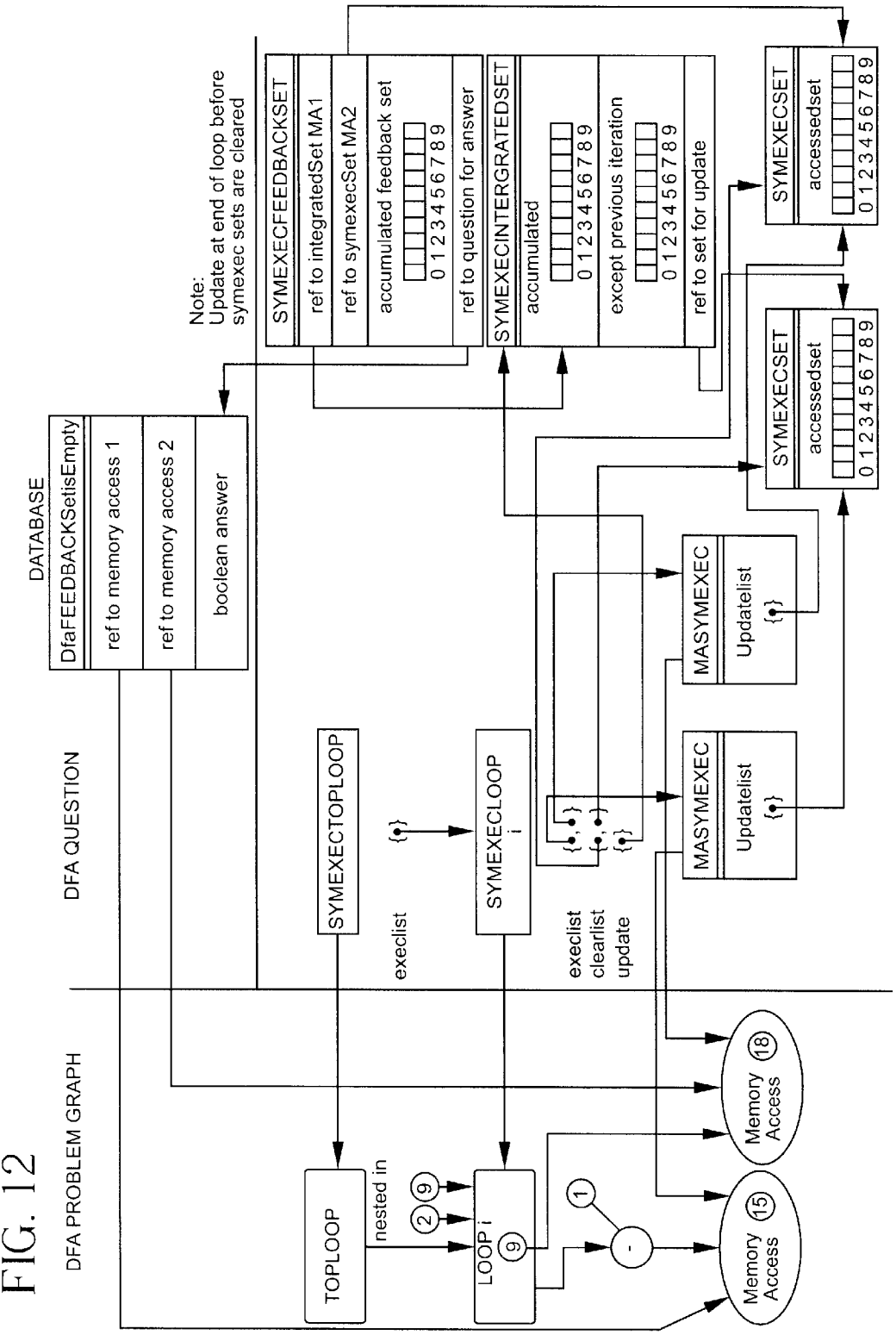
Figure 13:
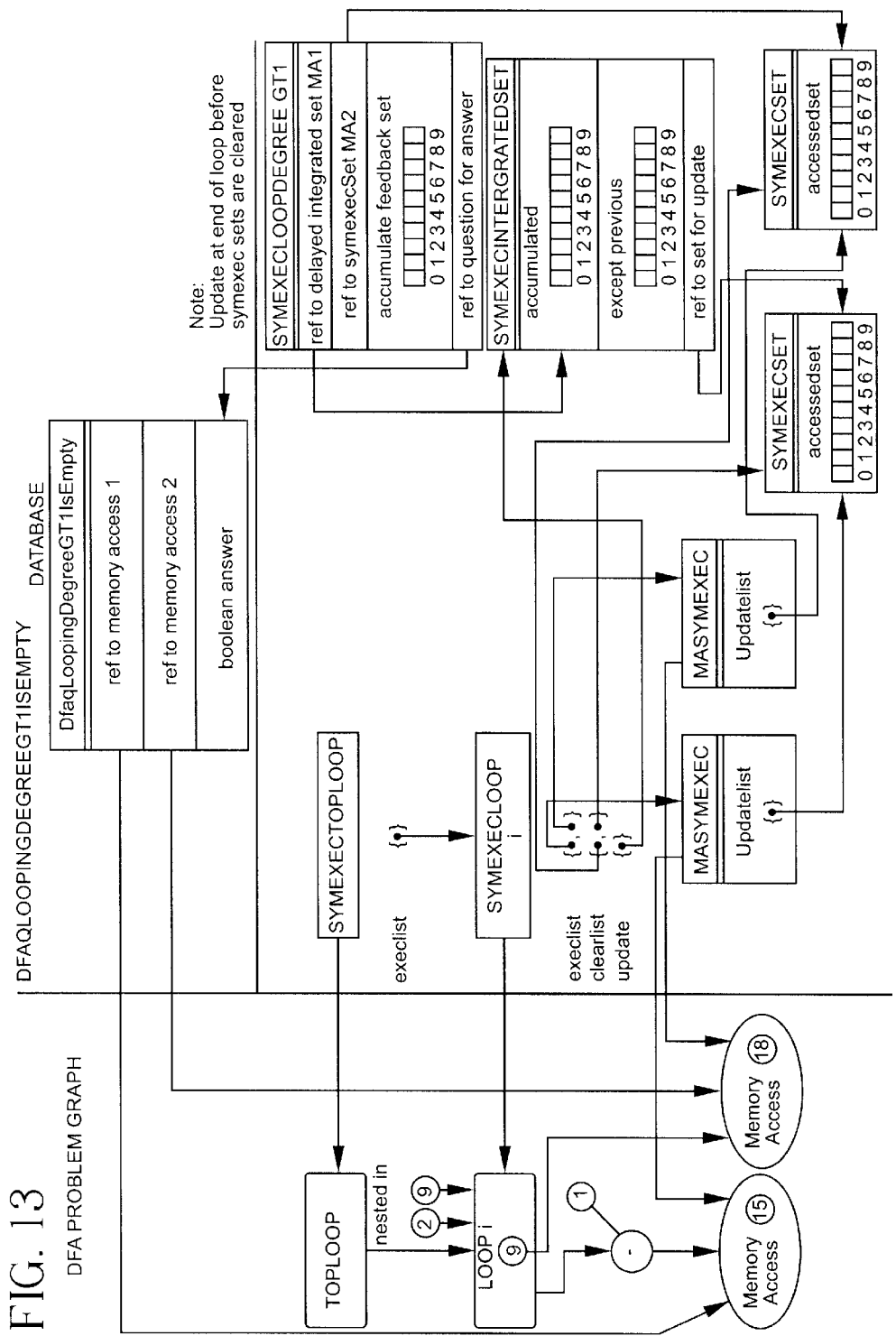
Figure 14:
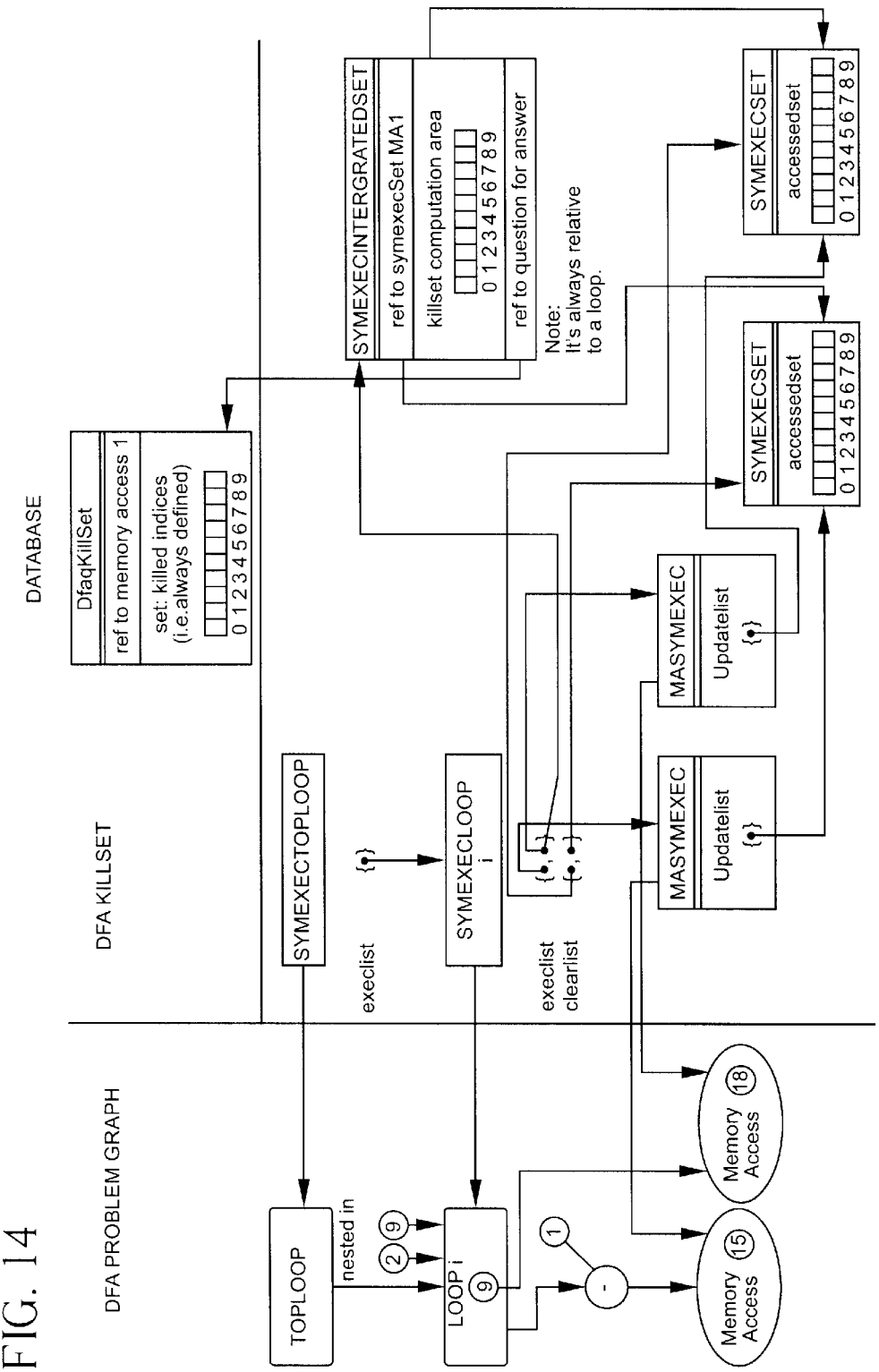

The following is a description of the database structure for the Question Data Base. The answers to the questions can either be boolean yes or no, or a bitvector or index set containing memory locations. The array router uses the answers to these questions to supply data and sequence edges, thus indicating parallelism in the code. Where no answer exists, the worst case is assumed (that is to say the operations cannot be executed in parallel). A snapshot of the questions asked for fibo[i−1] in $Sfg_{13}$fetchOp in the example illustrated in FIGS. 3, 5 and 6 is shown in FIG. 9.

dfaqSet: This gives all accessed locations for a single memory access.

dfaqKillSet: This gives the array elements which are always defined for a write memory access. The dfaqKillSet is computed relative to a loop. Over the entire program the killset for A[i] is the complete array while the killset relative to a loop is empty. This is important for determining definitions in a loop nest. Consider the following example:

```
1 double A[16]
2
3 A[0] = 0;
4 for (int i=0;i<16;i++) {
5 A[i] = 1.0;
6 }
7 b = A[0];
```

In this example the store operation at line 5 (A[i]) unconditionally defines all elements of A. The value stored at line 3 (A[0]) can not be accessed since it is killed (overwritten) by the store at line 5 (A[i]). In this example line 3 will be optimized away.

dfaqDirectSetIsEmpty: This returns a "true" if two memory accesses do not access the same memory locations during one particular iteration of the loop. Otherwise it returns a "false." Consider the following example:

```
1
2 double A[16];
3 double accu = 0.0;
4 A[0] = 0;
5 for (int i=1;i<16;i++) {
6 double tmp = A[i−1];
7 A[i] = tmp + 1.0;
8 accu += A[i];
9 }
```

The direct set of the read at line 6 (A[i1]) with the write at line 7 (A[i])is empty, since the same memory location is never accessed for a value of the loop iterator i. The direct set between the write at line 7 and the read at line 8 is not empty.

dfaqFeedbackSetIsEmpty: This returns a "true" is a memory access (fetch/store) uses or defines values used or defined by another memory access in a previous iteration of the loop.

dfaqFeedbackSetLoopingDegreeGT1IsEmpty: This returns a "true" if a memory access uses values accessed by other memory accesses in an iteration of the loop more than one iteration ago.

dfaqIsSingleDefinition: This returns a "true" if a memory access in a loop accesses a memory location only once. Otherwise it returns a "false."

The following pseudo code shows the algorithm for generating the DFA Questions:

```
1 PROCEDURE CREATEDFAQUESTIONS
2 BEGIN
3 FOR all non-scalar variables V DO
4 BEGIN
5 FOR all accesses A to variable V DO
6 BEGIN
7 CREATEDFAQUESTION (A)
8 FOR all loops L in which A is nested DO
9 BEGIN
10 CREATEDFAQUESTION (A,L)
11 END
12 Let B be A
13 WHILE (B has predecessors) DO
14 BEGIN
15 Let B be the predecessor of B
16 CREATEDFAQUESTION (A,B)
17 FOR all loops L in which both A and B are nested DO
18 BEGIN
19 CREATEDFAQUESTION (A,B,L)
20 END
21 END
22 END
23 END
24 END
25
26 PROCEDURE CREATEDFAQUESTION (access A)
27 BEGIN
28 IF (A is a fetch OR A is a store) THEN
29 // To accumulate the accessed elements over the entire program execution
30 create a dfaqSet and register it with A
31 FI
32 END
33
34 PROCEDURE CREATEDFAQUESTION (access A, loop L)
35 BEGIN
36 IF (A is a store) THEN
37 // Track if A is single definition for the execution of L
38 create a dfaqIsSingleDefinition for the (A,L) combination
39
40 // Track if A always defines the entire range for the execution of L
41 create a dfaqKillSet for the (A,L) combination
42 FI
43 END
44
45 PROCEDURE CREATEDFAQUESTION (access A,access B)
46 BEGIN
47 IF (A is a fetch and B is a store) THEN
48 // Track if there is a direct flow from B to A
49 create a dfaqDirectSetIsEmpty for (A,B)
50 FI
51 IF (A is a store and (B is a store or a fetch)) THEN
52 create a dfaqDirectSetIsEmpty for (A,B)
53 FI
54 END
55
56 PROCEDURE CREATEDFAQUESTION (access A,access B,loop L)
57 BEGIN
58 IF ((A is a fetch and B is a store) OR
59 (A is a Store and (B is a store OR B is a fetch))) THEN
60
61 // Track if there is a feedback flow from A to B
```

```
62  create a dfaqFeedbackSetIsEmpty for (A,B,L)
63
64  // Track if there is a feedback flow from B to A
65  create a dfaqFeedbackSetIsEmpty for (B,A,L)
66
67  // Track if there is a feedback over more than one iteration
      from B to A
68  create a dfaqFeedbackSetLoopingDegreeGT1IsEmpty for (B,A,L)
69
70  // Track if there is a feedback over more than one iteration from A
      to B
71  create a dfaqFeedbackSetLoopingDegreeGT1IsEmpty for (A,B,L)
72  FI
73  END
74
```

Having generated questions relating to the index path, the next step is a "symbolic execution" which provides answers to those questions (see S8). Prior to the symbolic execution however, a symbolic execution data structure is preferably created by examination of the question data base (see S7).

The data structure is made up of two parts:
an execution structure ("symbolic execution structure") linked to the DFA Problem Graph and having the same hierarchy.
sets used to accumulate data during symbolic execution.

There are two parts to the symbolic execution data structure (index set database 34): the execution structure linked to the DFA Problem Graph and having the same hierarchy, and the sets used to accumulate index set data during execution. The data structure contains a set of objects containing pointers to memory accesses and index sets plus back pointers to the DFA Problem Graph and the DFA Questions.

symExecTopLoop: This structure represents and execution of the algorithm. It includes a list of symExec-MemoryAccesses and symExecLoops (see below).

symExecLoop: This structure represents and execution of a loop. It has a list of symExecMemoryAccesses and symExecLoops. It also has a list of induction sources to be updated and lists containing the different sets, each of which must be updated at a particular stage during the execution of a loop iteration.

symExecMemoryAccess: This structure represents a memory access and has a list of sets which must be updated when a memory access occurs.

symExecFeedback: This structure represents the induction variables from the DFA Problem Graph.

The Sets are as follows:

symExecSet: This is a set which is used to collect accessed elements.

symExecIntegratedSet: This is a set made up of two sets, one of which accumulates all the memory accesses that have occurred over the execution of a specific symExec object, for example all memory accesses that occurred during the execution of a particular loop.

The other set is similar, but does not include the accessed elements from the previous iteration.

The other sets are directed at the resolution of the questions and make use of a combination of symExecSets, symExecIntegratedSets and other logic to resolve the questions. The sets are:

symExecAccessedSet which resolves dfaqSet.

symExecDirectSet which resolves dfaqDirectSetIsEmpty.

symExecFeedbackSet which resolves dfaqFeedbackSetIsEmpty.

symExecLoopDegreeGT1Set which resolves dfaqFeedbackSetLoopDegreeGT1IsEmpty.

symExecKillSet which resolves dfaqKillSet.

FIGS. 10–14 show a set of DFA questions in the context of the DFA Problem Graph, DFA Question database and the symbolic execution data structure in the example used throughout this Detailed Description.

The following pseudo code illustrates the creation of the symbolic execution data structures.

```
1   PROCEDURE CREATESYMEXECDATA
2   BEGIN
3   FOR all questions Q in the question database DO
4     IF ( Q isA dfaqset ) THEN
5       create a symExecAccessedSet for access A of Q
6     ELSEIF (Q isA dfaqIsSingleDefinition) THEN
7       // Implies no feedback on itself
8       create a symExecFeedSet for (L,A,A) where A is the access of Q and L is
9       the loop of Q.
10    ELSEIF (Q isA dfaqKillSet) THEN
11      create a symExecKillSet for (L,A) where A is the access of Q and L is
12      the loop of Q.
13    ELSEIF (Q isA dfaqDirectSetIsEmpty) THEN
14      create a symExecDirectSet for (L,A,B) where A,B are accesses of Q and L
15      is the loop of Q.
16    ELSEIF (Q isA dfaqFeedbackSetIsEmpty) THEN
17      create a symExecFeedbackset for (L,A,B) where A,B are accesses of Q and L
18      is the loop of Q.
19    ELSEIF (Q isA dfaqFeedbackSetLoopingDegreeGt1IsEmpty) THEN
20      create a symExecLoopDegreeGT1Set for (L,A,B) where A,B are accesses of Q and L
21      is the loop of Q.
22    FI
23  END
24  END
25
26  // Please note that if no inter-procedural dataflow analysis needs to be performed
27  // exactly 1 memory access node will have been created for each fetch/store
28
29  PROCEDURE CREATESYMEXECACCESSEDSET (access A)
```

-continued

```
 30 BEGIN
 31 FOR (all memory access nodes MAN generated for access A) DO
 32 // Multiple memory access nodes might be generated in case of
 33 // inter-procedural analysis
 34
 35 create a symExecIntegratedSet for MAN and register it with the symExecTopLoop
 36 // Each time the memory access MAN is executed the indices accessed will
 37 // be accumulated in the integrated set. Resolving the associated question
 38 // is simply a copy of the accumulated indices to the dfaqSet set.
 39
 40 // During backannotation the accessed set for A will be the union of the
 41 // sets computed for each of the memory access nodes
 42 END
 43 END
 44
 45 PROCEDURE CREATESYMEXECFEEDBACKSET (loop L, access A, access B)
 46 BEGIN
 47 FOR (all memory access nodes MAN_A generated for A) DO
 48 FOR (all memory access nodes MAN_B generated for B) DO
 49 create a symExecIntegratedSet for MAN_A and register it with the symExecLoop for L
 50 create a symExecSet for MAN_B and register it with the symExecLoop for L
 51 // Each time the loop L is executed, at the end of the execution the indices
 52 // in the intersection of the integrated set for MAN_A and the accessed set
 53 // of MAN_B are added the accumulated result for the feedbackset.
 54 END
 55 END
 56 // During backannotation the feedbackset for the (A,B) pair with respect will be the
 57 // union of the feedback sets for (MAN_A,MAN_B) pairs with respect to loop L
 58 // Resolving the dfaqFeedbackSetIsEmpty is then done by checking if the
 59 // feedback set is empty or not.
 60 END
 61
 62 PROCEDURE CREATESYMEXECLOOPDEGREEGT1SET (loop L, access A, access B)
 63 BEGIN
 64 FOR (all memory access nodes MAN_A generated for A) DO
 65 FOR (all memory access nodes MAN_B generated for B) DO
 66 create a symExecIntegratedSet for MAN_A and register it with the symExecLoop for L
 67 create a symExecSet for MAN_B and register it with the symExecLoop for L
 68 // Each time the loop L is executed, at the end of the execution the indices
 69 // in the intersection of the integrated set for MAN_A (except the indices that
 70 // were accumulated during the previous iteration of the Loop) and the accessed
 71 // set of MAN_B are added the accumulated result.
 72 END
 73 END
 74 // During backannotation the union of all the accumulated results will form the set
 75 // from which the result of (L,A,B) is computed.
 76 // Resolving the dfaqFeedbackSetLoopingDegreeGt1IsEmpty is done by checking if
 77 // the union set is empty or not.
 78 END
 79
 80 PROCEDURE CREATESYMEXECKILLSET (loop L, access A)
 81 BEGIN
 82 FOR ( all memory access nodes MAN generated for A) DO
 83 create a symExecSet for MAN and register it with the symExecLoop for L
 84 // Each time the loop L is executed (The loop L itself, NOT an iteration of the loop )
 85 // at the end of the execution the indices in the intersection of the accessed set
 86 // for MANA, and the accumulated result (so far) are set as the accumulated result
 87 END
 88 // During backannotation the intersection of all the results for MANA is computed
 89 // and this is set as the dfaqKillSet for A.
 90 END
 91
 92 PROCEDURE CREATESYMDIRECTSET (loop L, access A,access B)
 93 BEGIN
 94 FOR (all memory access nodes MAN_A generated for A) DO
 95 FOR (all memory access nodes MAN_B generated for B) DO
 96 create a symExecSet for MAN_A and register it with the symExecLoop for L
 97 create a symExecSet for MAN_B and register it with the symExecLoop for L
 98 // Each time the loop L is executed, at the end of the execution the indices
 99 // in the intersection of the accessed set for MAN_A and the accessed set of
100 // MAN_B are added to the accumulated result
101 END
102 END
103 // During backannotation the result for (L,A,B) is computed by 'or'-ing the result
104 // of the of test on an non empty accumulated result for (L,MAN_A,MAN_B)
105 END
```

Figure 15:
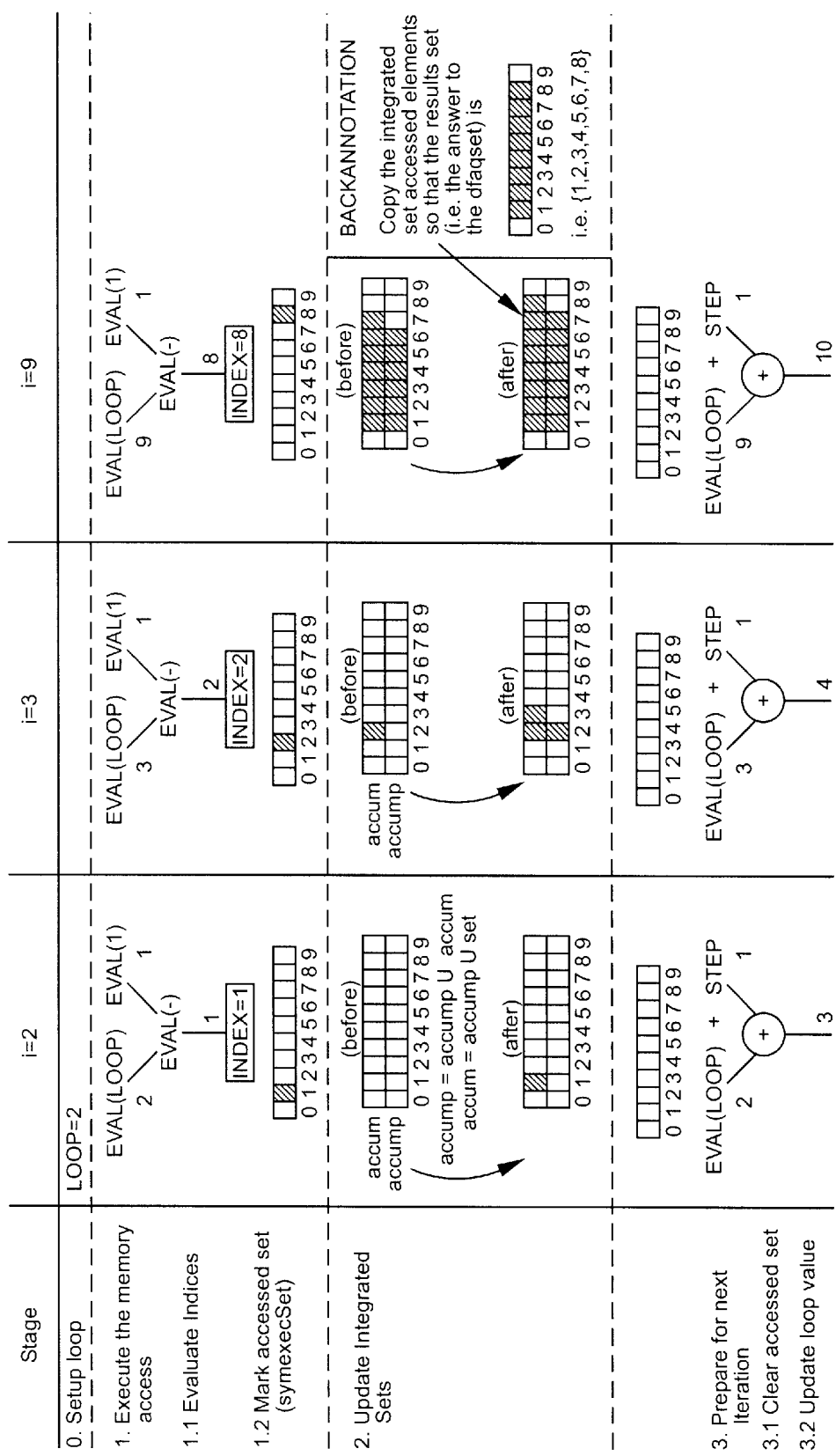

The next step is the "symbolic execution" of the program (see S8). FIG. 15 shows a snapshot of this procedure, including the symbolic execution data structure and the back-annotation of results to the DFA Question Database 32 (described below). Only those parts of the program that contain loops and index expressions are executed. That is to say a representation of the index expressions is executed. This fills the index sets mentioned above. The execution is performed by DFA Analyzer 38 which evaluates the data nodes in the DFA Problem Graph (i.e. executing the index path of the program thereby filling the index sets).

The following pseudo code shows the algorithm for the symbolic execution of the program:

```
 1 PROCEDURE SYMEXECLOOP (L)
 2 BEGIN
 3 Let LEFT be EVAL(L.LEFTNODE)
 4 Let RIGHT be EVAL(L.RIGHT)
 5 Let STEP be L.STEP
 6
 7 FOR all induction variables V (symExecFeedback objects) in
     Loop L DO
 8 Compute initial value for V by evaluating the initialNode of V
 9 END
10
11 FDR (I = LEFT; I <= RIGHT; I = I + STEP) DO
12 // STEP 1: loop iterator
13 Set evaluation value of L to I
14
15 // STEP 2: compute set of indices accessed during iteration I
16 FOR all memory accesses M in loop L DO
17 do SYMEXECMEMDRYACCESS(M)
18 END
19
20 // STEP 3: compute the value of the induction variables for
     the next iteration
21 FOR all induction variables V in loop L DO
22 evaluation update code for V and cache value
23 END
24
25 // STEP 4: feed updated values forward to next iteration
26 FOR all induction variables V in loop L DO
27 Set evaluation value of V equal to the cached value (from step 3)
28 END
29
30 // STEP 5: accumulate data
31 // Needs the integrated set from previous iteration
32 // and the elements accessed during this iteration
33 FOR all symExecFeedbackSet, symExecLoopDegreeGT1Set,
     symExecDirecSet,
34 symExecKillSet in loop L DO
35 use information from memory access during this iteration to update
36 the partial result.
37 END
38
39 // STEP 6: update integrated sets
40 FOR all symExecIntegratedSets IS in loop L DO
41 Extend IS with the elements accessed during this iteration
42 END
43
44 // STEP 7: prepare for next iteration
45 FOR all symExecSets S in loop L DO
46 Clear S for next iteration . . .
47 END
48 END
49
50 // prepare for next execution of the loop L
51 FOR all symExecIntegratedSets IS in loop L DO
52 Clear accumulated result for IS
53 END
54 END
55
56 PROCEDURE SYMEXECMEMORYACCESS (access A)
57 BEGIN
58 FOR all indices I of memory access A DO
59 evaluate index I
60 END
61 FOR all symExecSets S attached to memory access A DO
62 Mark the (I1, . . ., In) index as used in S
63 END
64 END
65
66 PROCEDURE EVAL(node N)
67 BEGIN
68
69 IF N is a constant THEN
70 return the constant
71 ELSIF N is an arithmetic operator THEN
72 FOR all arguments ARG of N DO
73 EVAL(ARG)
74 END
75 // Example: EVAL(ARG1): 3; EVAL(ARG2): 2; type of N: +;
     result: 3+2 => 5
76 return result of arithmetic operation with evaluated arguments as
     inputs
77 ELSEIF N is a logical operator THEN
78 FOR all arguments ARG of N DO
79 EVAL(ARG)
80 END
81 // Example: EVAL(ARG1): 3; EVAL(ARG2): 2; type of N: <;
     result: 3<2 => 0 (false)
82 return result of logical operation with evaluated arguments as inputs
83 ELSEIF N is a loop iterator THEN
84 return current value of loop (set by SYMEXECLOOP procedure)
85 ELSEIF N is a bit operator THEN
86 FOR all arguments ARG of N DO
87 EVAL(ARG)
88 END
89 // Example: EVAL(ARG1): 1; type of N slice 1 bit at position
     0(LSB); result: 1
90 return result of bit operation with evaluated arguments as inputs
91 ELSEIF N is a look up table THEN
92 EVAL (index node of N)
93 return the value of the constant table at the evaluated index
94 ELSEIF N is an induction variable THEN
95 return current value of induction variable (set by SYMEXECLOOP
     procedure)
96 FI
97 END
```

Finally, the information gathered by the symbolic execution is fed into the questions database 32. This step is referred to as "back annotation" of the question database (See S9). In the case of non-inter-procedural dataflow analysis, this is done by a simple transfer of data. In the case of inter-procedural dataflow analysis, the data in the different symExec objects is merged to obtain the answers.

This is illustrated in FIG. 15 which shows the progression of the pseudo code example set forth above, the filling of the index sets and the back annotation of index sets to the question database.

Figure 16:
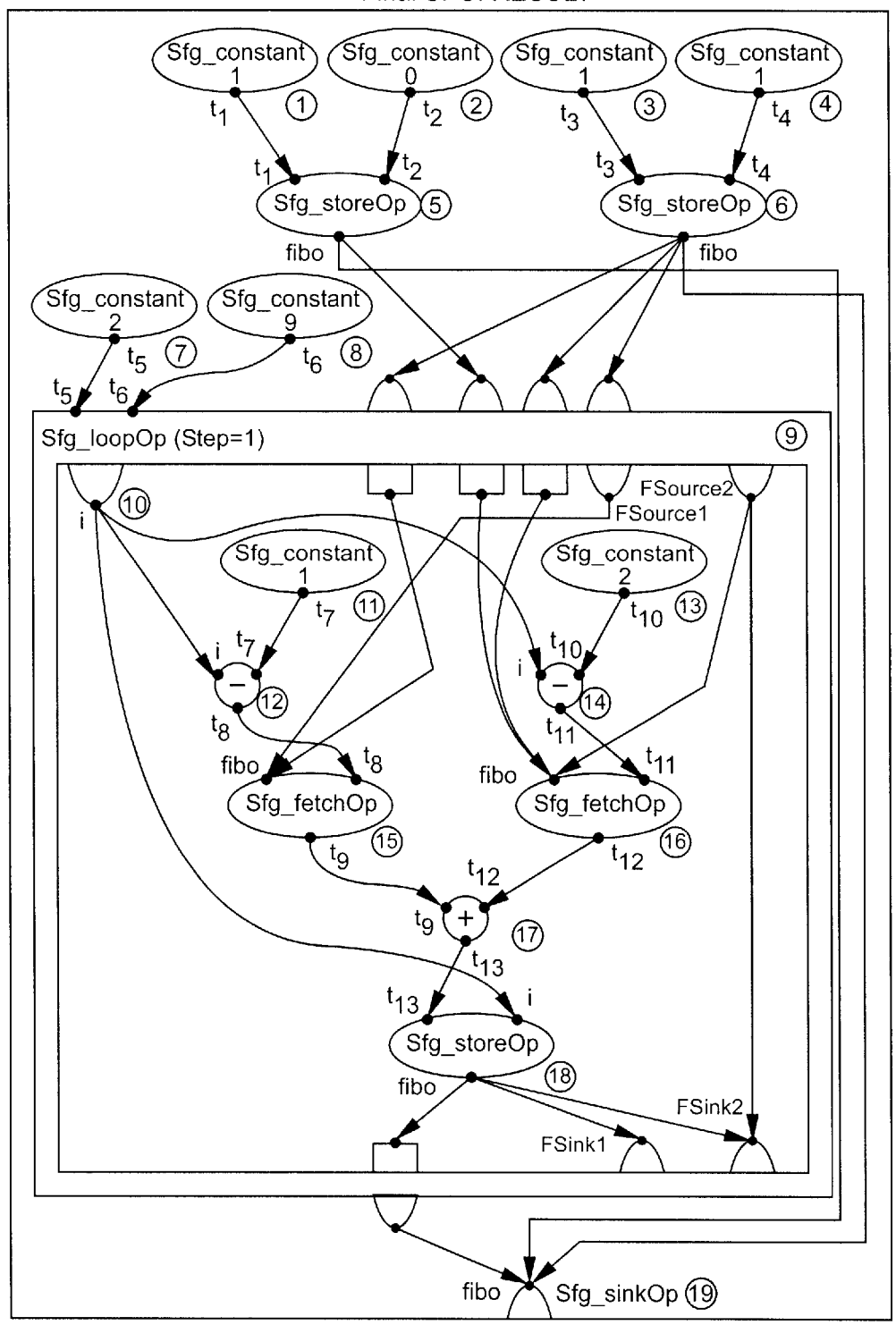
FIG. 16 is the resulting signal flow graph for the example in the Detailed Description, routed with data and sequence edges, and as used to expose parallelism.

The final SFG shown in FIG. 16 is completed by array router 40 which adds the data and sequence edges to the scalar routed SFG 24 (See S10). In the case of non-scalar variables, the array router uses the data generated by the dataflow analysis described above or it resorts to worst case scenarios about memory access to the non-scalar variable.

The basic algorithm for the worst case situation is as follows:

```
1 void foo (
2 int fill
3 int DATA[10]
4 ) {
```

```
 5 int i,j;
 6 for (i = 0; i < 5; i++) {
 7 // Worst case DATA[i] stores {0 . . . 9}
 8 // DFA case DATA[i] stores {0 . . . 4}
 9 DATA[i] = fill;
10 }
11 for (j=5; j < 10; j++) {
12 // Worst case DATA[i] stores {0 . . . 9}
13 // DFA case DATA[i] stores {5 . . . 9}
14 DATA[j] = fill;
15 }
16 }
```

This is the worst-case scenario assumption referred to above in the discussion of the construction of the DFA Problem Graph. In the worst case scenario, the DATA[i] and DATA[j] operations will have to be sequentialized since their defining (i.e. worst case) sets overlap. If the data from the data flow analysis is taken into account, then the router will not sequentialize the two operations, thus increasing the degree of parallelism since (their defining sets are disjoint).

The algorithm for the array router is as follows:

```
 1 PROCEDURE ROUTER
 2 FOR all variables V DO
 3 FOR all accesses A of variable V DO
 4 IF (A is a writer) THEN
 5 FOR all loops L which contain A DO
 6 IF ( (worst case scenario applies) OR
 7 (A is not single definition with respect to Loop L)) THEN
 8 Create feedback sequence edges for A with respect to Loop L
 9 effectively keeping A during one iteration of loop L in sequence
10 with the next iteration of L
11 FI
12 END
13 FI
14 Let B equal A
15 WHILE (there is a predecessor for B) DO
16 Let B be the predecessor of B
17 IF (B is a reader and A is a reader) THEN
18 continue WHILE loop since there is no need to sequentialize
19 readers
20 FI
21 IF (B and A access disjoint memory locations) THEN
22 continue WHILE loop since they can not influence each other
23 (completely parallel paths)
24 FI
25 Let BtoAType be Sequence
26 IF (B is a writer and A is a reader) THEN
27 Let BtoAType be Data
28 FI
29 Let AtoBType be Sequence
30 IF (B is a reader and A is a writer) THEN
31 Let AtoBType be Data
32 FI
33 IF (there is no producer between B and A which defines the
34 complete set of memory locations accessed by A (killtest) AND
35 B and A are not in mutually exclusive blocks THEN
36 IF ( (worst case scenario applies) OR
37 (the direct set between A and B is not empty)) THEN
38 route and edge from B to A of the type BtoAType
39 FI
40 FI
41 IF (V is scalar) THEN
42 ROUTESCALARFEEDBACK (B, A, BtoAType)
43 ROUTESCALARFEEDBACK (A, B, AtoBType)
44 ELSE
45 IF (A is a writer and B is a writer) THEN
46 ROUTEWRITERFEEDBACK (B, A, BtoAType)
47 ROUTEWRITERFEEDBACK (A, B, AtoBType)
48 ELSE
49 ROUTEFEEDBACK (B, A, BtoAType)
50 ROUTEFEEDBACK (A, B, AtoBType)
51 FI
52 FI
53 END
54 END
55 END
56 END
57
58 PROCEDURE ROUTEWRITERFEEDBACK (FROM, TO, TYPE)
59 BEGIN
```

-continued

```
60  FOR all Loops L common to FROM and TO DO
61  IF ( (worst case scenario applies) OR
62  (the feedback set for the (FROM, TO) combination with respect to loop L
63  is not empty) ) THEN
64  Create feedback construction (SRC = source, SNK = sink) for Loop L
65  route an edge from FROM to SNK of TYPE type
66  route and edge from SRC to TO of TYPE type
67  FI
68  END
69  END
70
71  PROCEDURE ROUTEFEEDBACK (FROM, TO, TYPE)
72  BEGIN
73  FOR all Loops L common to FROM and TO DO
74  IF ( there is a set of unconditional successors of FROM in the body of
75  L which define the complete set of memory locations used by TO ) THEN
76  // Kill check from FROM forward
77  continue with next loop L
78  FI
79  IF ( there is a set of unconditional predecessors of TO in the body of
80  L which define the complete set of memory locations used by FROM ) THEN
81  // Kill check from TO backward
82  continue with next loop L
83  FI
84  // FROM can possibly 'see' TO over iterations of loop L
85  IF ( (worst case scenario applies) OR
86  the feedback set for the (FROM, TO) combination with respect to loop L
87  is not empty) ) THEN
88
89  // FROM does see TO over iterations of loop L
90  Create feedback, construction (SRC = source, SNK = sink) for Loop L
91  route an edge from FROM to SNK of TYPE type.
92  route and edge from SRC to TO of TYPE type.
93
94  // Is it overmore then one iteration ?
95  Let feedthrough needed be true
96  IF ( the feedback set for the (FROM, TO) combination with respect to
97  loop L is empty: for iterations of L not immediately preceding
98  a particular iteration of L) THEN
99  Let feedthrough needed be false
100 FI
101 IF (feedthrough needed is true) THEN
102 route an edge from SRC to SNK of type TYPE
103 FI
104 FI
105 END
106 END
107
108 PROCEDURE ROUTESCALARFEEDBACK (FROM, TO, TYPE)
109 BEGIN
110 FOR all Loops L common to FROM and TO DO
111 IF ( there is an unconditional successor of FROM in the body of
112 L which defines the variable ) THEN
113 // Kill check from FROM forward
114 continue with next loop L
115 FI
116 IF ( there is an unconditional predecessors of TO in the body of
117 L which defines the variable ) THEN
118 // Kill check from TO backward
119 continue with next loop L
120 FI
121 // FROM does see TO over iterations of loop L
122 Create feedback construction (SRC = source, SNK = sink) for Loop L
123 route an edge from FROM to SNK of TYPE type.
124 route and edge from SRC to TO of TYPE type.
125
126 Let feed through needed be false
127 IF (( FROM is a writer and FROM is in a conditional block) OR
128 ( TO is a writer and TO is in a conditional block)) THEN
129 // Not sure it writes during an iteration of loop L
130 Let feedthrough needed be true
131 FI
132 IF (feedthrough needed is true) THEN
133 route an edge from SRC to SNK of type TYPE
134 FI
135 END
136 END
```

The output of array router 40 is a fully routed SFG 42, as shown in FIG. 16. Additional optimization is performed by peephole optimizer 44, which ultimately results in final SFG 46. Final SFG 46 (and fully routed SFG 42) reflect the operations in source code 10 which can be executed in parallel. The execution of source code 10 has thus been optimized.

The foregoing is a description of the preferred embodiment of the invention. Persons of ordinary skill in the art will recognize that a wide variety of alternative and equivalent implementations of the invention are enabled by this description without departing from its spirit and scope.

We claim:

1. A method of compiling a computer program, the program comprising a plurality of operations having a sequence, the method comprising:

extracting from the computer program, information describing the operations and the sequence of the operations and storing the extracted information as a data structure;

identifying operations in the computer program which involve index expressions;

symbolically executing the operations in the computer program which involve index expressions, thereby producing information describing memory accesses; and identifying the operations which can be executed in parallel based on the information describing memory accesses.

2. The method of claim 1 further comprising the step of generating a symbolic execution data structure comprising a representation of the operations in the computer program which involve the memory accesses and index expressions.

3. The method of claim 2 wherein the symbolic execution data structure comprises a data flow problem graph.

4. The method of claim 2, wherein the step of symbolically executing the operations comprises executing the symbolic execution data structure and noting memory locations addressed by the computer program.

5. The method of claim 1 further comprising the step of generating a question data structure comprising questions relating to how the computer program accesses memory.

6. The method of claim 5 further comprising the steps of analyzing the computer program by interrogating the computer program with the questions, thereby obtaining answers to the questions, and back annotating the answers into the question data structure.

7. The method of claim 5 wherein the symbolic execution data structure comprises a data flow problem graph and further comprising the steps of analyzing the data flow problem graph by interrogating the computer program with the questions, thereby obtaining answers to the questions, and back annotating the answers into the question data structure.

8. The method of claim 1 further comprising the step of generating index sets relating to memory access by the operations of the program which involve index expressions and wherein the step of executing the operations in the computer program which involve index expressions comprises filling the index sets.

9. An apparatus for compiling computer code, the apparatus comprising:

first signal flow analysis means for creating a signal flow data structure for index expressions used by the computer code, wherein the first signal flow analysis means comprises:

means for identifying an index path in the computer code, the index path comprising operations involved in computing indices used in memory accesses by index expressions;

symbolic execution means for executing the index path, thereby extracting information relating to index expression memory accesses.

10. The apparatus of claim 9 further comprising a question database comprising questions relating to memory accesses by index expressions.

11. The apparatus of claim 10 further comprising means for generating index sets comprising responses to questions in the question database.

12. The apparatus of claim 9 further comprising second signal flow analysis means for creating a signal flow data structure for scalar variables used by the computer code.

13. The apparatus of claim 9 wherein the signal flow data structure is a signal flow graph.

14. A method of exposing parallelism in a computer program, comprising:

extracting from the computer program, information describing a plurality of operations specified by the computer program, and the sequence of the operations and storing the extracted information as a data structure;

identifying operations in the computer program which involve at least non-linear index expressions;

symbolically executing the operations specified by the computer program which involve at least non-linear index expressions, thereby producing information describing memory accesses; and identifying the operations which can be executed in parallel based on the information describing memory accesses.

15. The method of claim 14, further comprising generating a question database comprising questions relating to how the computer program accesses memory; interrogating the information extracted from the computer program; and responsive to interrogating, receiving answers.

16. The method of claim 15, wherein the answers comprise data in a format selected from the group consisting a Boolean yes/no, a bitvector, and index set containing memory locations.

17. The method of claim 15, wherein the questions are asked for at least one relevant triplet of fetch, store and loop in an index path.

18. The method of claim 17, wherein the interrogation determines at least whether memory accesses are disjoint.

19. The method of claim 18, wherein the interrogation determines at least whether data flows from a first loop iteration to the next sequential loop iteration.

20. The method of claim 19, wherein the interrogation determines at least whether data flows from a first loop iteration to a non-sequential loop iteration.

* * * * *